US009933929B1

(12) United States Patent
Pitsillides et al.

(10) Patent No.: US 9,933,929 B1
(45) Date of Patent: Apr. 3, 2018

(54) AUTOMATIC LAYOUT MANAGEMENT THROUGH STATIC GUI ANALYSIS

(71) Applicant: The MathWorks, Inc., Natick, MA (US)

(72) Inventors: Alice Pitsillides, Chestnut Hill, MA (US); Christian A. Portal, Holliston, MA (US); Jyoti Gandhe, Sharon, MA (US); Joseph F. Hicklin, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 210 days.

(21) Appl. No.: 14/677,485

(22) Filed: Apr. 2, 2015

Related U.S. Application Data

(63) Continuation-in-part of application No. 13/627,302, filed on Sep. 26, 2012, now abandoned.

(51) Int. Cl.
*G06F 3/048* (2013.01)
*G06F 3/0484* (2013.01)

(52) U.S. Cl.
CPC ...... *G06F 3/04847* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 5,673,401 A | 9/1997 | Volk et al. | |
| 5,778,377 A | 7/1998 | Marlin et al. | |
| 5,873,106 A | 2/1999 | Joseph | |
| 5,886,694 A | 3/1999 | Breinberg et al. | |
| 6,850,255 B2 | 2/2005 | Muschetto | |
| 6,950,993 B2 | 8/2005 | Breinberg | |
| 7,432,928 B2 | 10/2008 | Shaw et al. | |
| 7,620,633 B1 | 11/2009 | Parsons et al. | |
| 7,730,418 B2 | 6/2010 | Wang et al. | |
| 9,576,393 B1 * | 2/2017 | Bethel | G06T 15/60 |
| 2003/0025693 A1 | 2/2003 | Haley | |
| 2004/0056894 A1 | 3/2004 | Zaika et al. | |

(Continued)

OTHER PUBLICATIONS

Merriam-Webster, "Dimension" www.merriam-webster.com/dictionary/dimension, 3 pages, Jan. 23, 2015 (print date).

(Continued)

*Primary Examiner* — Tize Ma
(74) *Attorney, Agent, or Firm* — Harrity & Harrity, LLP

(57) ABSTRACT

A device may generate a graph of a set of elements included in a graphical user interface. An attribute of an element, of the set of elements, may be represented by a vertex of the graph. A layout relationship associated with the set of elements may be represented by an edge of the graph. The device may detect a change to the graphical user interface from a first display condition to a second display condition. The device may determine another vertex location for the vertex corresponding to another attribute for the element based on detecting the change from the first display condition to the second display condition and based on the graph of the set of elements. The device may provide, for display, the set of elements in the second display condition based on the other attribute for the element.

20 Claims, 35 Drawing Sheets

(56) References Cited

U.S. PATENT DOCUMENTS

| | | |
|---|---|---|
| 2004/0183838 A1 | 9/2004 | Lahiri |
| 2005/0172261 A1 | 8/2005 | Yuknewicz et al. |
| 2005/0229157 A1 | 10/2005 | Johnson |
| 2006/0107229 A1 | 5/2006 | Matthews et al. |
| 2007/0011620 A1 | 1/2007 | Mendel et al. |
| 2007/0094609 A1 | 4/2007 | Gilboa et al. |
| 2007/0101279 A1 | 5/2007 | Chaudhri et al. |
| 2007/0150821 A1 | 6/2007 | Thunemann et al. |
| 2007/0256024 A1 | 11/2007 | Schell et al. |
| 2008/0059571 A1 | 3/2008 | Khoo |
| 2008/0098019 A1 | 4/2008 | Sthanikam et al. |
| 2008/0175636 A1 | 7/2008 | Sakuraba et al. |
| 2009/0064222 A1 | 3/2009 | Dawson et al. |
| 2009/0172562 A1 | 7/2009 | Lai |
| 2010/0199173 A1 | 8/2010 | Morooka |
| 2010/0235428 A1 | 9/2010 | Kikkawa |
| 2010/0313140 A1 | 12/2010 | Bank et al. |
| 2011/0099494 A1 | 4/2011 | Yan et al. |
| 2011/0107243 A1* | 5/2011 | Jain .................. G06F 17/30997 715/762 |
| 2014/0365905 A1* | 12/2014 | Chedeau ................ G06Q 50/01 715/744 |
| 2015/0339002 A1* | 11/2015 | Arnold ................. G06F 3/0481 715/854 |

OTHER PUBLICATIONS

Molin et al., "A GUI Builder for Erlang/GS", Computing Science Department, Dec. 4, 1996, 69 pages.

Esposito, "Documents Do Matter: Serve Them Nicely and Effectively with Avalon Document Services", Aug. 2004, 9 pages.

Kuo et al., "Generating Form-Based User Interfaces for XML Vocabularies", Nov. 2-4, 2005, 3 pages.

Wikipedia "Responsive Web Design", http://en.wikipedia.org/wiki/Responsive_web_design, Mar. 20, 2015, 5 pages.

* cited by examiner

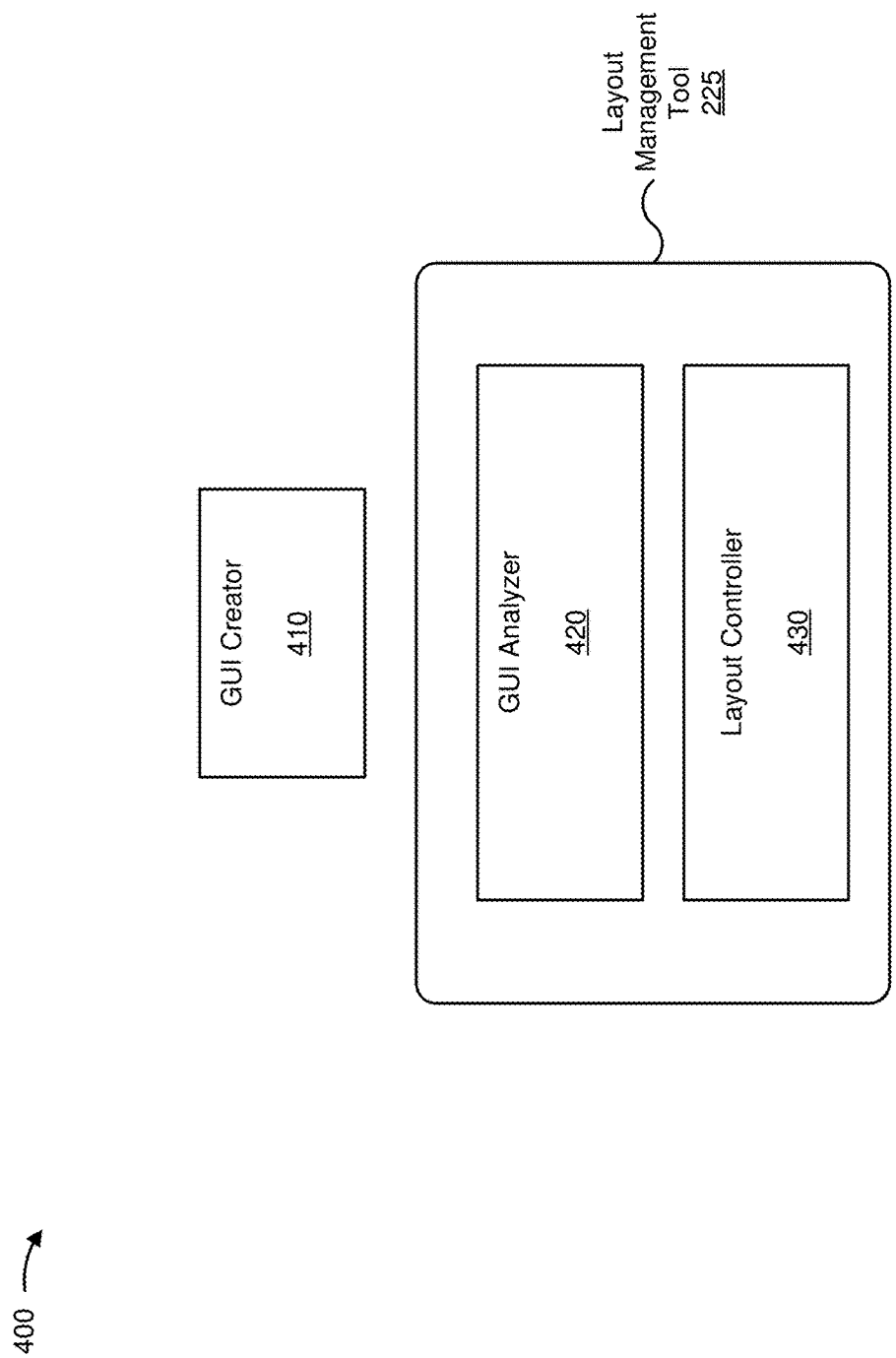

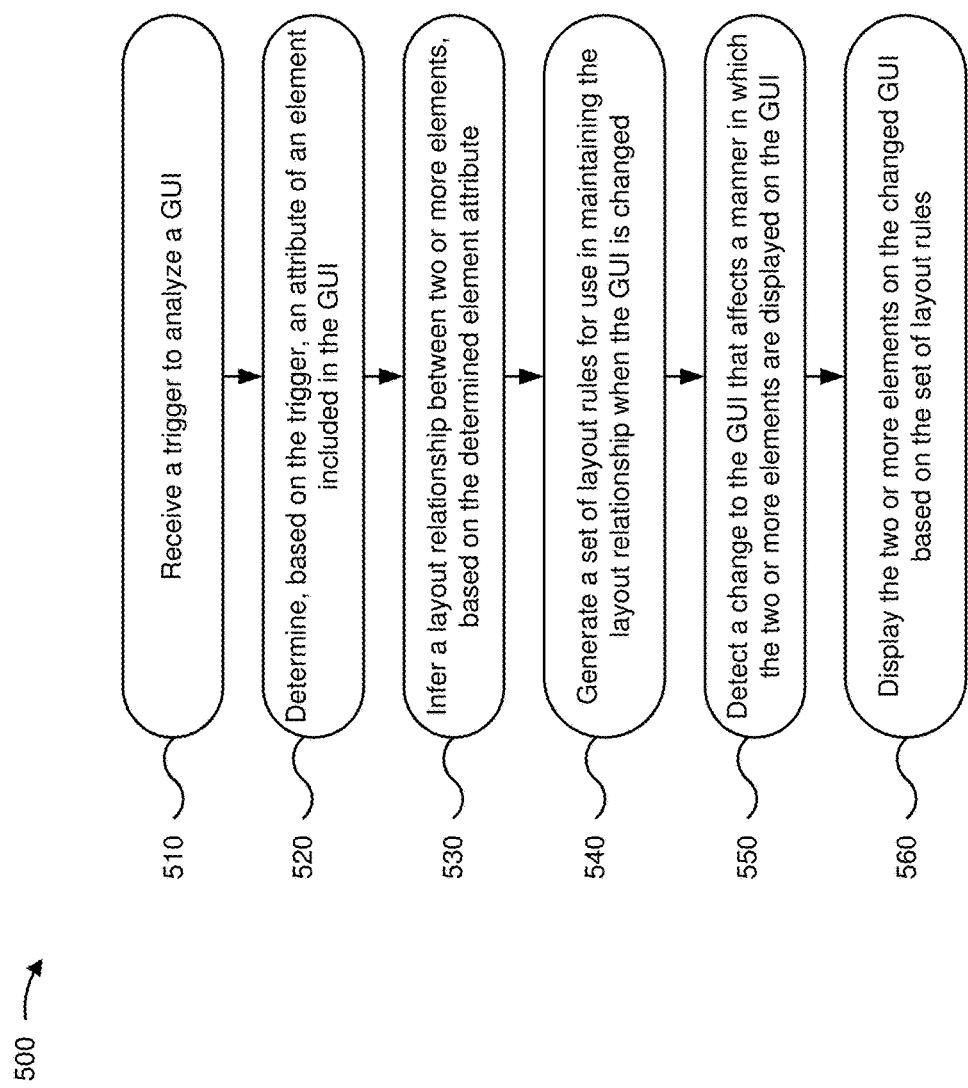

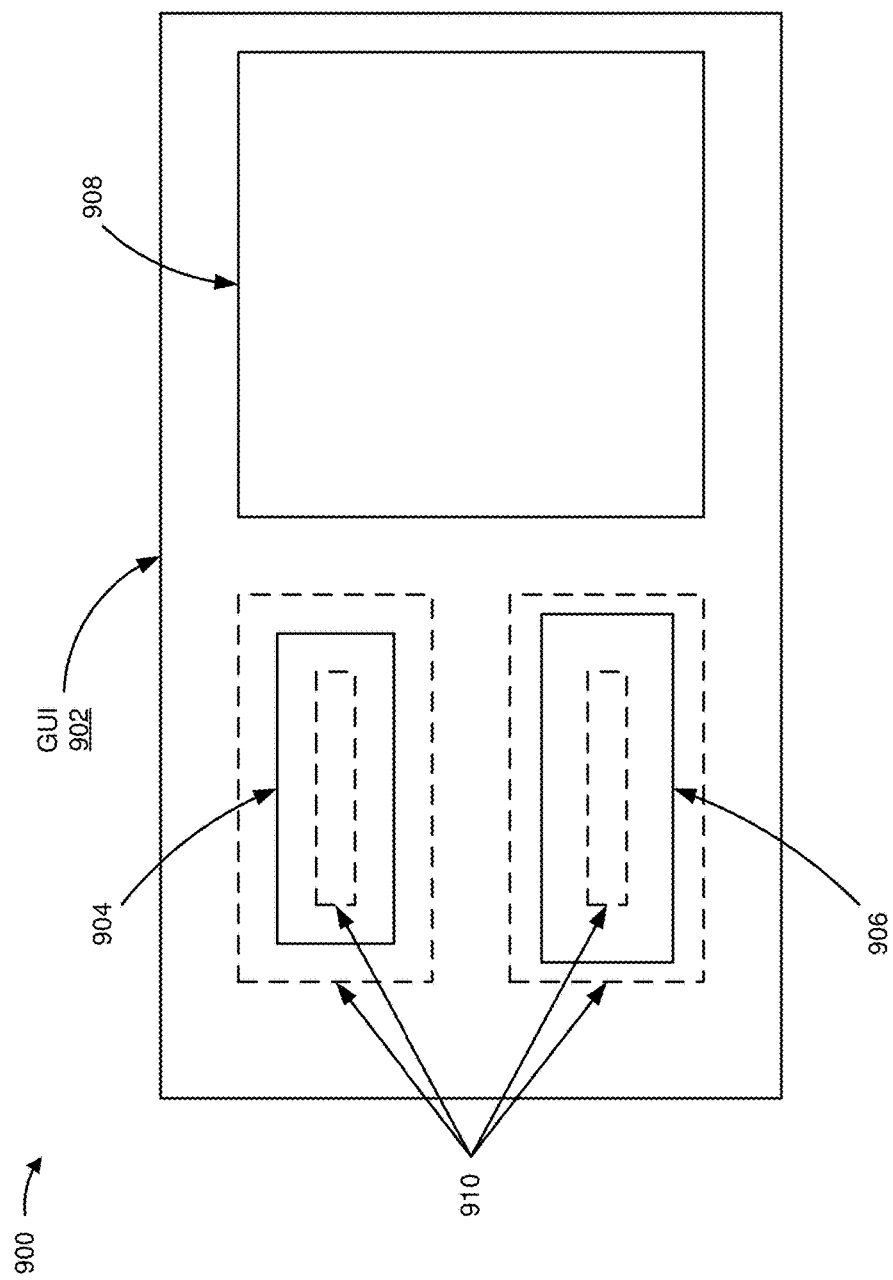

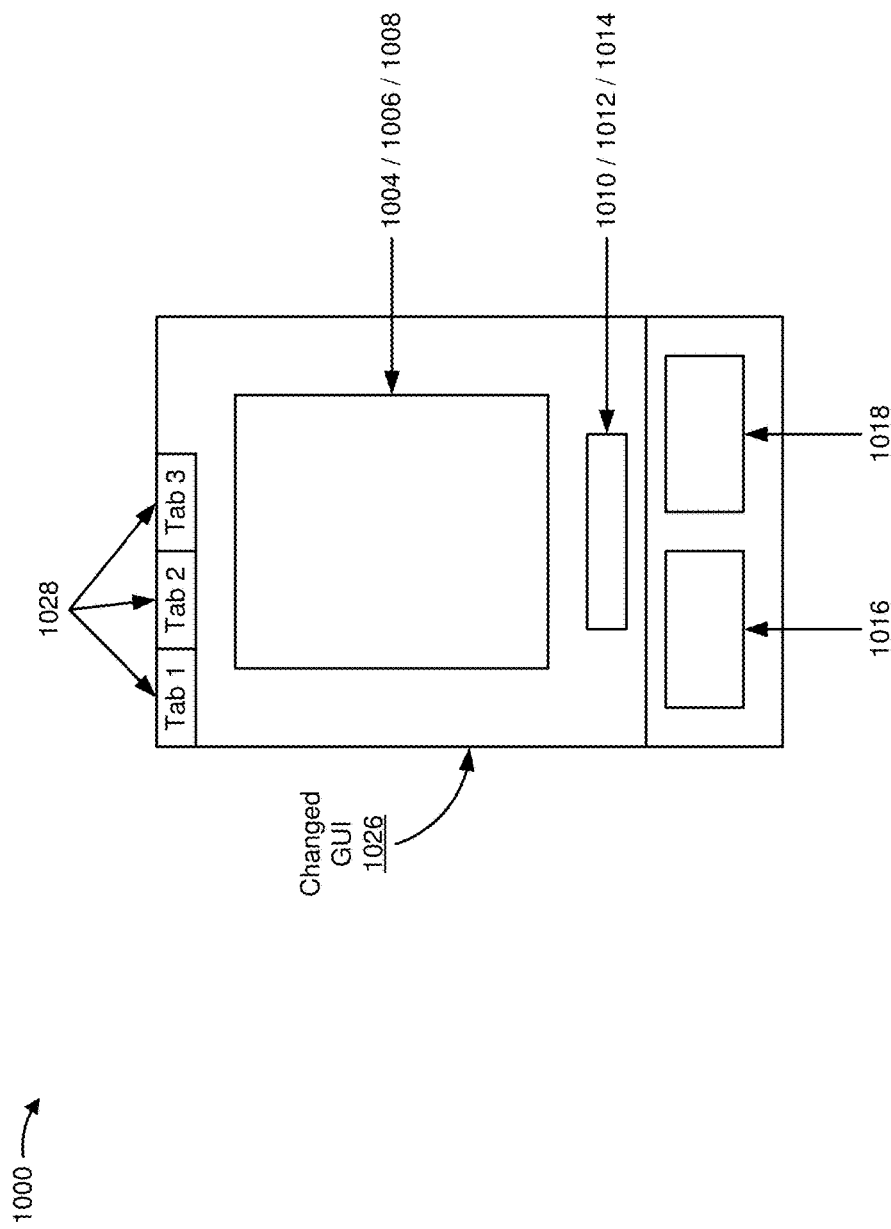

AUTOMATIC LAYOUT MANAGEMENT THROUGH STATIC GUI ANALYSIS

RELATED APPLICATION

This application is a continuation-in-part of U.S. patent application Ser. No. 13/627,302, filed on Sep. 26, 2012, the content of which is incorporated by reference herein in its entirety.

BRIEF DESCRIPTION OF THE DRAWINGS

FIG. 4 is a diagram of example functional components of one or more of the devices of FIG. 2;

FIG. 5 is a flow chart of an example process for displaying a GUI based on layout relationships inferred from the GUI;

FIGS. 9A and 9B are diagrams of example implementations relating to the example process shown in FIG. 5;

FIGS. 10A and 10B are diagrams of example implementations relating to the example process shown in FIG. 5;

DETAILED DESCRIPTION

Figure 1:
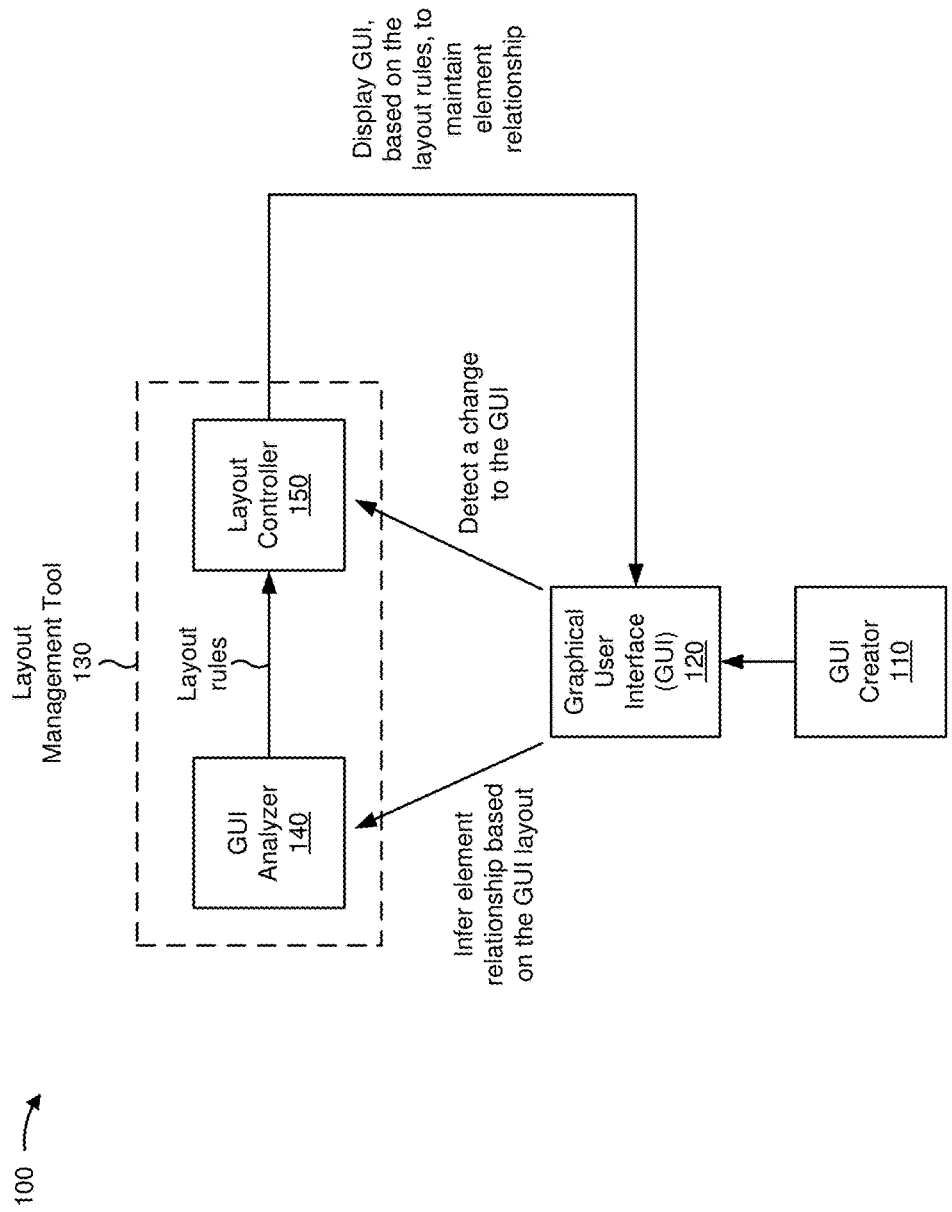
FIG. 1 is a diagram of an overview of an example implementation described herein.

The following detailed description of example implementations refers to the accompanying drawings. The same reference numbers in different drawings may identify the same or similar elements.

A user may create a graphical user interface (GUI) to be used with a computer program. The user may create the GUI by specifying a layout for various elements on the GUI, such as a position and size of windows, buttons, images, text boxes, etc., on the GUI. When the GUI is changed, such as by resizing the GUI, displaying the GUI on a different device, or the like (e.g., with or without changing elements of the GUI), the layout of the elements on the GUI may change in a manner that is undesirable to the user. For example, some elements may be arranged differently, some relationships between elements may be altered, or the like.

In order to control the manner in which the layout of the elements changes when the GUI is changed, the user may write programming code that controls the layout. The programming code may be specific to an environment, such as a web environment. Adapting the programming code to another environment may be difficult and prone to errors. An example of controlling the manner in which the layout of elements may be maintained, may include maintaining a positional relationship between elements, maintaining a quantity of elements being displayed, or the like. To maintain the layout of the elements, a user may write, at the time the GUI is created, programming code that explicitly specifies a set of layout relationships of the elements, such as explicitly writing program code for relative sizes between different elements, minimum sizes for elements, maximum sizes for elements, or the like. For example, the user may write programming code to specify a distance between two elements, a relative orientation between two elements, an alignment between two elements, or the like.

Additionally, the user may be required to specify different layout styles for different sized displays. For example, the user may be required to specify that for a first size display a set of button elements are displayed as a horizontal menu bar, and that for a second size display the horizontal menu bar is to be replaced as a drop-down menu element. As another example, a UI for a blog on a desktop browser with a set of navigation links at the top may include program code written by the user to indicate that, when displayed on a mobile device, the UI is to position the set of navigation links in a side panel of the UI. In other words, the user may be required to specify a first type of element for a first display condition and a second type of element for a second display condition. Lacking a user specification, a device may remove elements of the GUI and/or provide large areas of white space in the GUI when the GUI is resized. Later, when the GUI is changed, the specified layout relationships can be utilized to maintain the layout of elements, the type of element utilized, or the like. However, the user may encounter difficulties when writing the programming code, and specifying layout relationships may be time consuming and prone to mistakes.

Implementations, described herein, may more effectively control the manner in which elements are displayed on a GUI when the GUI is changed, by inferring layout relationships among the elements based on the GUI layout when the GUI is created, generating layout rules that maintain the layout relationships, and using the generated layout rules to control the GUI layout when the GUI is changed. In some implementations, described herein, the layout relationships are generated automatically based on the initial GUI display, thereby obviating the need for a user to specify and/or write programming code establishing the layout relationships. In some implementations, described herein, a graph may be utilized to represent and/or manipulate layout relationships to maintain the layout when the GUI is resized. The graph may include nodes (e.g., vertices) and connections (e.g., edges) to represent elements and/or layout relationships thereof, and may be represented graphically, textually, or in another manner.

FIG. 1 is a diagram of an overview of an example implementation 100 described herein. As shown in FIG. 1, a GUI creator 110 may be used to create a GUI 120. A layout management tool 130 may control the manner in which the GUI is displayed, using a GUI analyzer 140 and a layout controller 150. GUI analyzer 140 may analyze GUI 120, and may infer layout relationships based on the layout of GUI 120. For example, GUI analyzer 140 may automatically determine one or more layout relationships based on the layout of GUI 120, such as an alignment relationship between two or more elements, an orientation relationship between two or more elements, a containment relationship between two or more elements, or the like, as described herein. In some implementations, the layout relationships are incorporated into a graph that may represent GUI 120. For example, an element of GUI 120 may be represented as one or more vertices of the graph and a layout relationship may be represented as an edge of the graph connecting two or more vertices of the graph. GUI analyzer 140 may generate layout rules based on the inferred layout relationships, and may provide the layout rules to layout controller 150. Layout controller 150 may detect a change to GUI 120, and may use the layout rules to display GUI 120 in a manner that maintains the inferred layout relationships.

Figure 2:
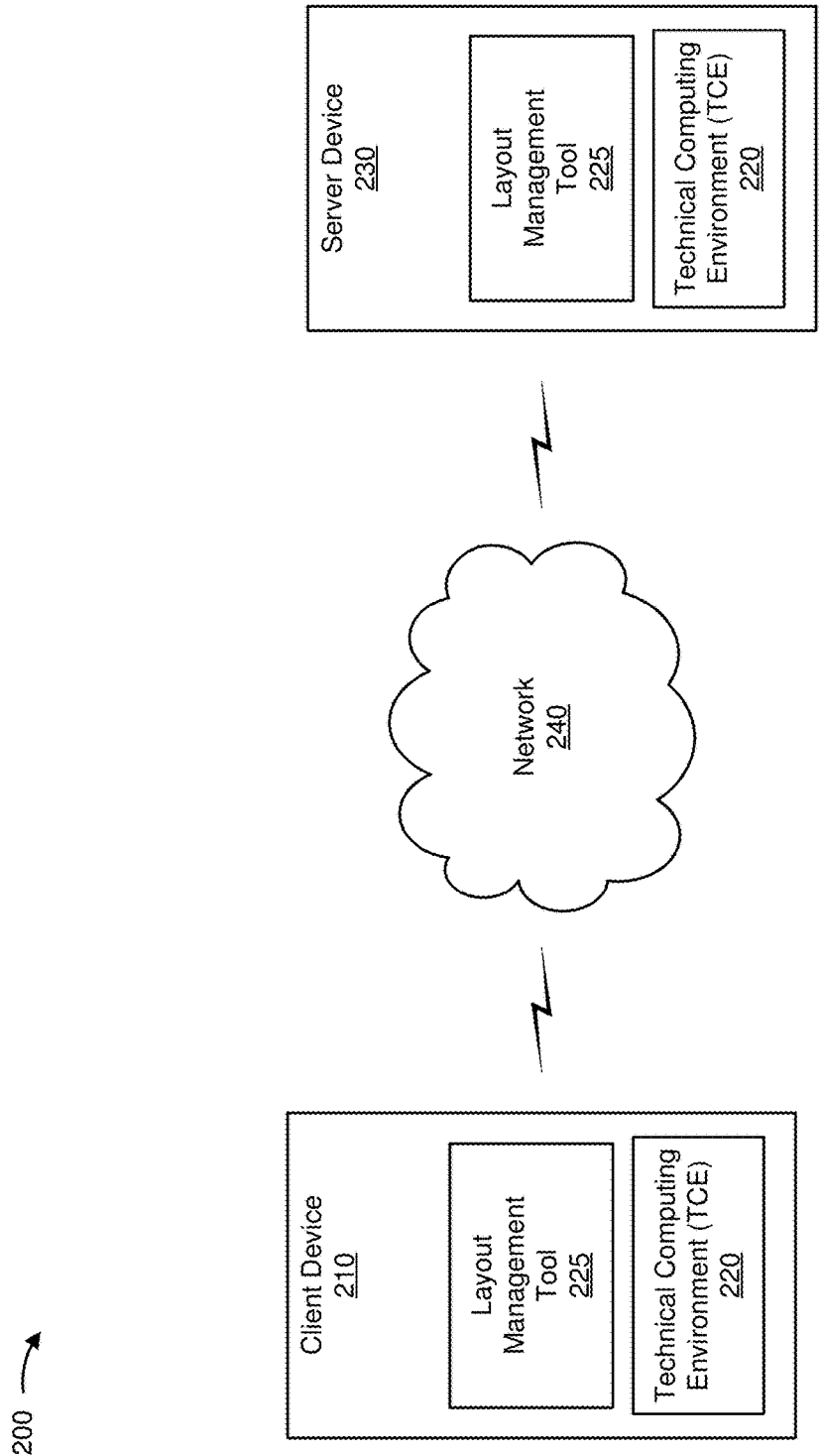
FIG. 2 is a diagram of an example environment in which systems and/or methods, described herein, may be implemented.

FIG. 2 is a diagram of an example environment 200 in which systems and/or methods, described herein, such as example implementation 100 of FIG. 1, may be implemented. As shown in FIG. 2, environment 200 may include a client device 210, which may include a technical computing environment (TCE) 220 and a layout management tool 225. Furthermore, environment 200 may include a server device 230, which may include TCE 220 and layout management tool 225, and a network 240. Devices of environment 200 may interconnect via wired connections, wireless connections, or a combination of wired and wireless connections. Layout management tool 225 may correspond to layout management tool 130 of FIG. 1.

Client device 210 may include one or more devices capable of receiving, generating, storing, processing, and/or providing information associated with a GUI. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

Layout management tool 225 may assist software developers (e.g., users) in controlling a GUI layout. In one example implementation, as shown in FIG. 2, layout management tool 225 may include client-side components and/or server-side components. The client-side components may be executed at client device 210, while the server-side components may be executed at server device 230. Additionally, or alternatively, depending on the size and/or complexity of the GUI to be analyzed and controlled, layout management tool 225 may execute exclusively at client device 210. In one example, layout management tool 225 may analyze a GUI that is being designed, on client device 210, for a target machine. The target machine may be a device, such as a cellular phone, a medical device, or another device that is to display the GUI being designed by a developer. In these situations, layout management tool 225 may include options so that, when analyzing the GUI for the target machine, layout management tool 225 can simulate the environment of the target machine. For example, layout management tool 225 may simulate a screen size, resolution, and/or other characteristics of a display of the target machine.

Server device 230 may include one or more devices capable of receiving, generating, storing, processing, and/or providing information associated with a GUI. For example, server device 230 may include a computing device, such as a server, a desktop computer, a laptop computer, a tablet computer, or a similar device. In some implementations, server device 230 may host TCE 220 and/or layout management tool 225. For example, client device 210 may provide information to server device 230 for processing, and processed information may be returned to client device 210. In some implementations, client device 210 may be used to access one or more TCEs 220 and/or one or more layout management tools 225 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
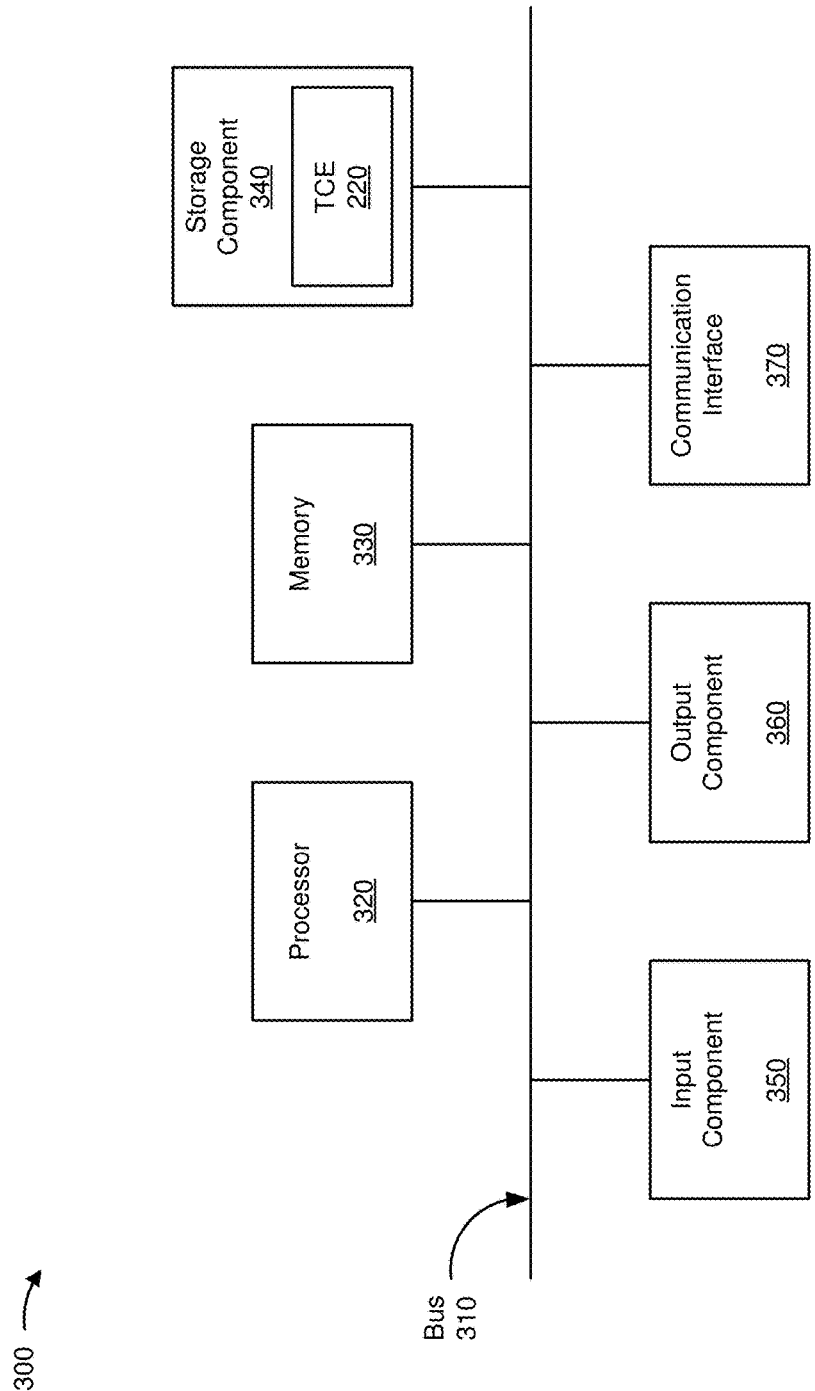
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a diagram of an example implementation 400, which may correspond to layout management tool 225, client device 210, and/or server device 230 in some implementations. In another implementation, one or more of the example functional components of device 400 may be implemented by another device or a collection of devices including or excluding layout management tool 225, client device 210, and/or server device 230. As shown in FIG. 4, device 400 may include a GUI creator 410, a GUI analyzer 420, and a layout controller 430. In some implementations, functional components 410-430 may be implemented using one or more devices 300 and/or one or more components of device 300.

GUI creator 410 may perform operations associated with creating a GUI and/or assisting a user in creating a GUI. For example, GUI creator 410 may include a programming environment that receives input from a user regarding the position, size, alignment, spatial distribution, etc., of elements on a GUI, such as windows, textual elements (e.g., text, strings, etc.), graphical elements (e.g., images, graphs, etc.), containers, buttons, sliders, menus, check boxes, radio buttons, dials, gauges, etc. GUI creator 410 may operate to facilitate creating the GUI for a desktop environment, a web environment, a mobile environment, and/or a combination of multiple environments, such as a GUI for display in a desktop environment and a mobile environment, or the like. In some implementations, characteristics of the elements may be specified using a programming language, such as an object-oriented programming language. As a first example, a user may select, from a library of elements, a particular element for the GUI, and GUI analyzer 420 may determine an attribute of the element, such as a font, a shape, an orientation, or the like, as described herein. As a second example, a user may create an element, such as via an element creation tool, via program code, or the like, and attributes may be specified and/or determined for the element. A layout relationship for an element may be determined by GUI analyzer 420, as described herein, without the user being required to provide the layout relationship.

GUI analyzer 420 may perform operations associated with analyzing a GUI to infer layout relationships based on the layout of the GUI, and generating layout rules based on the layout relationships. In some implementations, GUI analyzer 420 may receive a GUI and/or programming code used to generate a GUI. The GUI and/or GUI code may include information that identifies an attribute of an element, such as a position, size, element type, color, line style, background image, font, font size, font style, etc., of the element. GUI analyzer 420 may analyze the GUI and/or the GUI code to determine attributes of elements, and may infer (e.g., determine automatically) layout relationships based on the attributes. GUI analyzer 420 may generate a set of layout rules (e.g., an instruction for verifying that layout relationships of an initial GUI are included in a resized GUI), based on the inferred layout relationships (e.g., alignment relationships, containment relationships, or the like), that govern the manner in which the elements are displayed when the GUI changes. In some implementations, GUI analyzer 420 may generate a data structure, and may store the layout rules in the data structure as programming code. GUI analyzer 420 may provide the layout rules and/or the data structure to layout controller 430. In some implementations, GUI analyzer 420 may analyze an initial layout of the GUI (e.g., a set of initial positions for a set of elements of the GUI) when the GUI is created (e.g., using GUI creator 410). For example, GUI analyzer 420 may determine a set of layout relationships without a user being required to specify attributes of elements, layout relationships between elements, or the like. As discussed, herein, the layout rules may be determined based on the initial layout of the GUI (e.g., without requiring user specification of layout rules, resizing behavior, or the like), in some implementations.

Layout controller 430 may perform operations associated with controlling a manner in which elements are displayed on a GUI when the GUI changes. In some implementations, layout controller 430 may receive, from GUI analyzer 420, a data structure (e.g., including programming code) and/or layout rules that govern the manner in which elements are displayed when the GUI changes. Layout controller 430 may detect a change to a GUI that affects a manner in which GUI elements are displayed, such as a change in size of the GUI, a change to a display on which the GUI is displayed, etc. Based on detecting the change, layout controller 430 may use the layout rules to control the manner in which elements are displayed on the changed GUI.

For example, when a GUI is resized without a layout of the GUI being managed by layout controller 430, elements may overlap, be omitted from display, or the like, the display may include blank spaces that could have been utilized to expand elements, etc. By contrast, layout controller 430 facilitates dynamic resizing of the GUI while maintaining layout relationships, thereby permitting elements to expand and/or contract without collision, blank spaces to be filled by elements, or the like.

The number of functional components shown in FIG. 4 is provided for explanatory purposes. In practice, device 400 may include additional functional components, fewer functional components, different functional components, or differently arranged functional components than those shown in FIG. 4. Additionally, or alternatively, one or more functional components of device 400 may perform one or more tasks described as being performed by one or more other functional components of device 400.

FIG. 5 is a flow chart of an example process 500 for displaying a GUI based on layout relationships inferred from the GUI. In some implementations, one or more process blocks of FIG. 5 may be performed by one or more components of layout management tool 225. Additionally, or alternatively, one or more process blocks of FIG. 5 may be performed by one or more components of another device or a collection of devices including or excluding layout management tool 225.

As shown in FIG. 5, process 500 may include receiving a trigger to analyze a GUI (block 510). In some implementations, GUI analyzer 420 may receive input from a user, an application, and/or a device, to analyze a GUI. For example, a user may create a GUI, using GUI creator 410, and may use an input mechanism (e.g., a button, a menu item, etc.) to trigger an analysis of the created GUI by GUI analyzer 420.

As further shown in FIG. 5, process 500 may include determining, based on the trigger, an attribute of an element included in the GUI (block 520). In some implementations, GUI analyzer 420 may analyze a GUI and/or programming code used to generate a GUI. The GUI and/or GUI code may include an element attribute that identifies a position, size, and/or element type of an element included in the GUI. For example, a position of an element may by identified by a coordinate (e.g., a pixel coordinate), and the coordinate may identify a center of the element, a border or edge of the element, a corner of the element, etc. As another example, a size of the element may be identified by a height of the element, a width of the element, an area of the element, etc. (e.g., measured in pixels and/or by coordinate values). As yet another example, an element type may be identified by an element type identifier, and may include a window, a textual element (e.g., text, a text box, etc.), a graphical element (e.g., an image, a graph, etc.), a container, a tab, an input mechanism (e.g., a menu item, a link, a button, etc.), and/or any other type of element that may be included in the GUI. In some implementations, GUI analyzer may determine the attributes of the element, and subsequently cause elements of the GUI to be displayed on a changed GUI in real time. For example, analyzer 420 may generate layout rules, as described herein, while the GUI is being changed.

As further shown in FIG. 5, process 500 may include inferring a layout relationship between two or more elements, based on the determined element attribute (block 530). In some implementations, GUI analyzer 420 may use the position, size, and/or element type of two or more elements included in the GUI to infer a layout relationship between the elements. The layout relationship may specify a manner in which the elements are displayed on the GUI. For example, the layout relationship may include a containment relationship, a proximity relationship, an alignment relationship, an element type relationship, a size relationship, etc., as discussed in more detail with regard to other figures, herein.

In some implementations, GUI analyzer 420 may infer (e.g., determine automatically) that a containment relationship exists between two elements when one of the elements is contained and/or positioned within the other element. GUI analyzer 420 may infer the containment relationship based on, the borders of an element being positioned within the borders of another element. For example, a textual element may be contained within a button, a button may be contained within a container, a container may be contained within a GUI window, etc.

In some implementations, GUI analyzer 420 may infer that a proximity relationship exists between two elements when one of the elements is positioned a particular distance from the other element. For example, two graphical elements may be positioned a particular distance from one another (e.g., their borders and/or centers may be a particular distance apart), a border around a textual element contained within a button may be positioned a particular distance from the border of the button, two elements may be positioned the same distance from a third element, a distance between the borders of two elements may be a same size as a distance between the borders of two other elements, etc.

In some implementations, GUI analyzer 420 may infer that an alignment relationship exists between two elements when a border of the first element (e.g., a top, bottom, left, or right border) is aligned with a border of the second element. Additionally, or alternatively, GUI analyzer 420 may infer that an alignment relationship exists between two elements when a center of the first element is aligned with a center of the second element. For example, a center of a button may be aligned with a center of a graphical element, a top border of a graphical element may be aligned with a top border of another graphical element, a center of an element may be aligned with a center of a GUI window, etc.

In some implementations, GUI analyzer 420 may infer that an element type relationship exists between two elements when the two elements have the same element type. Additionally, or alternatively, GUI analyzer 420 may infer that an element type relationship exists between two elements when the two elements have a different element type. For example, two buttons may both share a button element type, a button and a graphical element may be of a different element type, etc.

In some implementations, GUI analyzer 420 may infer that a size relationship exists between two elements when one of the elements is larger than, smaller than, or a same size as the other element. For example, a button may be smaller than a graphical element, a textual element may be smaller than a button, two buttons may be the same size, etc.

Returning to FIG. 5, process 500 may include generating a set of layout rules for use in maintaining the layout relationship when the GUI is changed (block 540). In some implementations, GUI analyzer 420 may use the inferred layout relationship to generate a layout rule. Additionally, or alternatively, GUI analyzer 420 may generate the layout rule as programming code, and may store the programming code in a data structure. In some implementations, GUI analyzer 420 may provide the layout rule, the programming code, and/or the data structure to layout controller 430. Example layout rules generated based on layout relationships are discussed in further detail in connection with other figures, herein.

As further shown in FIG. 5, process 500 may include detecting a change to the GUI that affects a manner in which the two or more elements are displayed on the GUI (block 550). In some implementations, layout controller 430 may detect the change to the GUI. The change to the GUI may include a change in size of the GUI (e.g., resizing the GUI), a change in size of an element included in the GUI (e.g., a container element), a change in size of a display on which the GUI is displayed (e.g., displaying the GUI on a tablet vs. a phone vs. a laptop computer vs. a desktop computer, etc.), a change in a resolution at which the GUI is displayed (e.g., a change in pixel size, pixel resolution, display resolution, image resolution, etc.), a change in a language, a font, and/or a character set used to display an element included in the GUI, a change in an operating system, an application, and/or a program used to display the GUI, and/or any other change to a GUI that affects a manner in which an element is displayed on the GUI.

As further shown in FIG. 5, process 500 may include displaying the two or more elements on the changed GUI based on the set of layout rules (block 560). In some implementations, layout controller 430 may receive, from GUI analyzer 420, the set of layout rules, programming code that includes and/or enforces the layout rules, and/or a data structure that includes the layout rules. Additionally, or alternatively, layout controller 430 may detect a change to a GUI, and may cause elements to be displayed on the changed GUI based on the layout rules. For example, layout controller 430 may maintain layout relationships, inferred by GUI analyzer 420, by changing the manner in which the elements are displayed on the changed GUI. In some implementations, layout controller 430 may cause an additional element to be displayed when displaying the two or more elements on the changed GUI. For example, when the GUI is resized to a threshold size, layout controller 430 may add an element (e.g., a scroll bar, a button, or the like) to facilitate including other elements of the GUI in the changed GUI.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
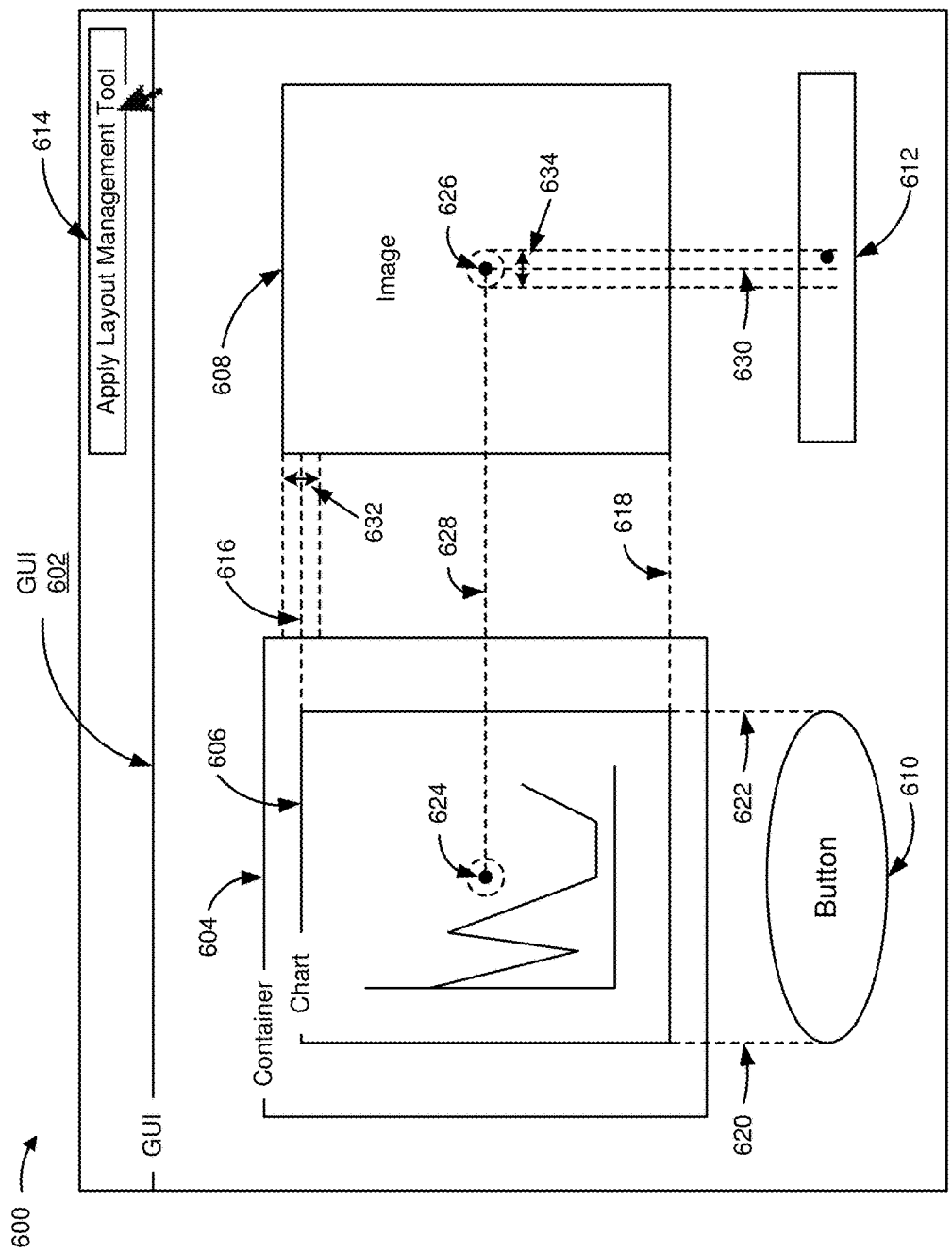
FIGS. 6A and 6B are diagrams of example implementations relating to the example process shown in FIG. 5.
Figure 6B:
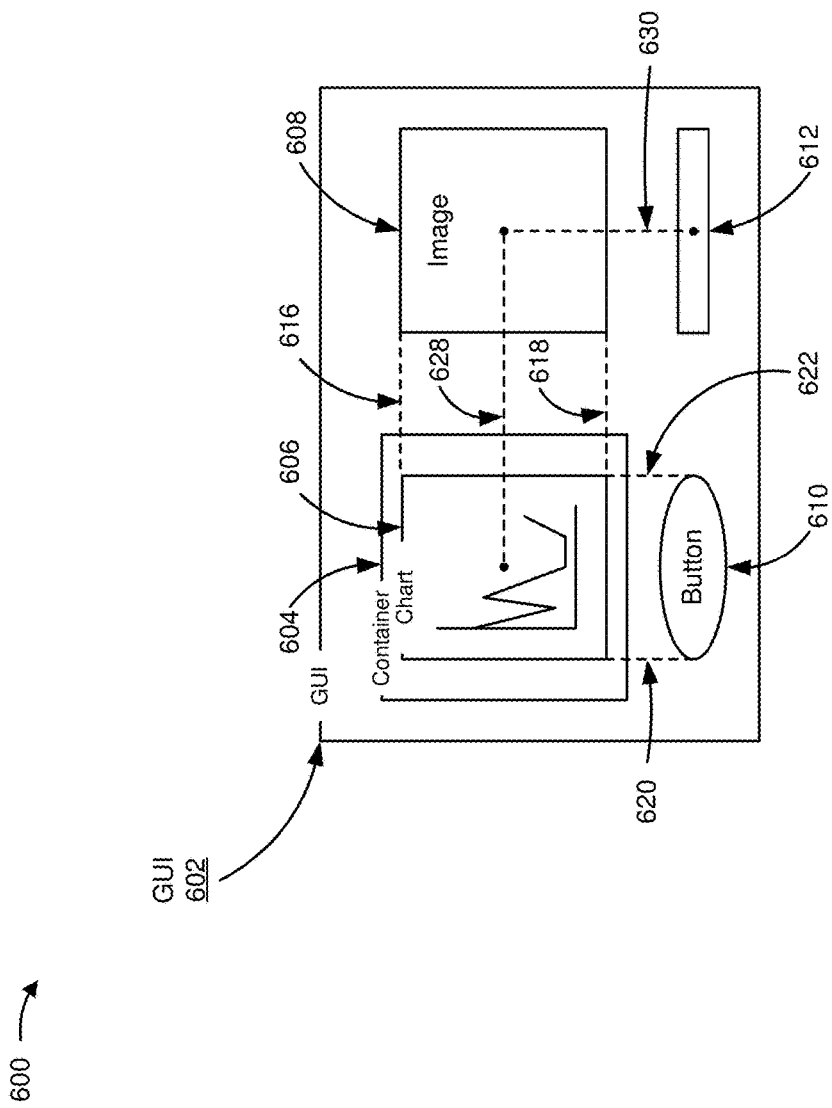

FIGS. 6A and 6B are diagrams of an example implementation 600 relating to process 500, shown in FIG. 5. FIG. 6A shows an example implementation of receiving a trigger to analyze a GUI, determining attributes of elements included in the GUI, inferring a layout relationship based on the attributes, and generating layout rules based on the inferred layout relationship. FIG. 6B shows an example implementation of detecting a change to a GUI and displaying elements included in the GUI based on the layout rules. FIGS. 6A and 6B also shown an example implementation of maintaining an alignment relationship between elements included in the GUI.

As shown in FIG. 6A, a user may create a GUI 602 that includes one or more elements, such as a container 604, a chart 606, an image 608, and buttons 610 and 612. In some implementations, the user may use GUI creator 410 to create GUI 602 using programming code that specifies an element attribute of elements 604-612, such as a position, size, and/or element type. Additionally, or alternatively, the user may use GUI creator 410 to create GUI 602 using graphical tools, such as via drag and drop, to specify the element attributes, and GUI creator 410 may create programming code that includes the element attributes. In some implementations, GUI creator 410 may provide assistance to the user, such as a set of suggestions for attributes and/or relationships, based on elements already added to GUI 602, based on a heuristic analysis of other GUIs similar to GUI 602, or the like.

As further shown in FIG. 6A, a user may provide input via an input mechanism 614 (e.g., a button, a menu item, etc.), which may trigger GUI analyzer 420 to analyze GUI 602. Based on the trigger, GUI analyzer 420 may determine attributes of elements 604-612, such as a position, a size, and/or an element type. In some implementations, GUI analyzer 420 may determine the attributes by parsing, searching, and/or interpreting programming code that specifies the element attributes.

In some implementations, GUI analyzer 420 may determine a layout relationship (e.g., an alignment relationship) between two or more elements 604-612, as indicated by reference numbers 616-634. The alignment relationship may include an alignment of an element border, such as a top border, a bottom border, a left border, a right border, etc. For example, GUI analyzer 420 may determine that a top border of element 606 and a top border of element 608 are aligned (e.g., by comparing a locational attribute, such as a pixel location, of the top border of element 606 and a locational attribute of the top border of element 608), as indicated by reference number 616. As another example, GUI analyzer 420 may determine that a bottom border of element 606 and a bottom border of element 608 are aligned (e.g., by comparing a locational attribute of the bottom border of element 606 and a locational attribute of the bottom border of element 608), as indicated by reference number 618. As yet another example, GUI analyzer 420 may determine that a left border of element 606 and a left border of element 610 are aligned (e.g., by comparing a locational attribute of the left border of element 606 and a locational attribute of the left border of element 610), as indicated by reference number 620. As yet another example, GUI analyzer 420 may determine that a right border of element 606 and a right border of element 610 are aligned (e.g., by comparing a locational attribute of the right border of element 606 and a locational attribute of the right border of element 610), as indicated by reference number 622.

Additionally, or alternatively, the alignment relationship may include an alignment of a center of an element. For example, reference number 624 may indicate the center of element 606, and reference number 626 may indicate the center of element 608. As an example, GUI analyzer 420 may determine that the centers of elements 606 and 608 are aligned (e.g., by comparing a locational attribute of a center-point of element 606 with a locational attribute of a center-point of element 608, by comparing locational attributes corresponding to borders of element 606 and element 608, or the like), as indicated by reference number 628. As another example, GUI analyzer 420 may determine that the centers of elements 608 and 612 are aligned, as indicated by reference number 630.

In some implementations, GUI analyzer 420 may determine the alignment relationship based on two coordinates (e.g., pixel coordinates), each associated with a corresponding element, having a same value. For example, GUI analyzer 420 may determine that elements 606 and 608 are aligned horizontally when a coordinate that specifies a vertical position of element 606 has the same value as a coordinate that specifies a vertical position of element 608. The vertical position may specify a vertical position of a border (e.g., a top or bottom border) of the element and/or a center of the element. As another example, GUI analyzer 420 may determine that elements 606 and 610 are aligned vertically when a coordinate that specifies a horizontal position of element 606 has the same value as a coordinate that specifies a horizontal position of element 610. The horizontal position may specify a horizontal position of a border (e.g., a left or right border) of the element and/or a center of the element.

Additionally, or alternatively, GUI analyzer 420 may determine the alignment relationship based on two coordinates, each associated with a corresponding element, having a similar value (e.g., within a tolerance). For example, GUI analyzer 420 may determine that there is an alignment relationship between the two elements when the difference in the values of the two coordinates satisfies a threshold (e.g., are less than a threshold value). For example, reference number 616 indicates that the top borders of elements 606 and 608 are not precisely aligned. However, reference number 632 indicates a tolerance around the vertical position indicated by reference number 616. Because a vertical position of the top borders of elements 606 and 608 are within the tolerance, GUI analyzer 420 may determine that the top borders of elements 606 and 608 are aligned.

Similarly, reference number 630 indicates that the centers of elements 608 and 612 are not precisely aligned. However, reference number 634 indicates a tolerance around the center position of element 608 (e.g., a circle with a radius of a tolerance value). Because a position of the centers of elements 608 and 612 are within the tolerance, GUI analyzer 420 may determine that the centers of elements 608 and 612 are aligned.

In some implementations, GUI analyzer 420 may generate a set of layout rules, based on the alignment relationship that maintains the alignment relationship when the GUI is changed. In some implementations, GUI analyzer 420 may cause the layout rules to be displayed (e.g., on GUI 602), and may receive user input to add layout rules, remove layout rules, and/or edit layout rules. In some implementations, the layout rules may displayed as text (e.g., programming code) describing the rule, and a user may add, remove, and/or edit the layout rules using the text. Additionally, or alternatively, the layout rules may be represented on GUI 602, such as by the dotted lines, dots, and/or tolerance arrows indicated by reference numbers 616-634 (and as indicated similarly in other figures, herein). GUI analyzer 420 may provide an input mechanism for a user to add, remove, and/or edit a layout rule represented on GUI 602 (e.g., by adding, removing, and/or editing the dotted lines, dots, tolerance arrows, etc.).

In some implementations, GUI analyzer 420 may provide the layout rules to layout controller 430, and layout controller 430 may use the layout rules to maintain the alignment relationship when the GUI is changed, as shown in FIG. 6B.

FIG. 6B shows an implementation where GUI 602 has been resized. As shown, layout controller 430 maintains alignment relationships 616, 618, 620, 622, 628, and 630 between elements 604-612 by applying the layout rules to GUI 602 during and/or after resizing. When maintaining an alignment relationship, layout controller 430 may ensure that elements remain aligned when GUI 602 changes.

The particular elements, layout relationships (e.g., alignment relationships), tolerances, and other information shown in FIGS. 6A and 6B are provided for explanatory purposes. In practice, layout management tool 225 may analyze and/or control additional information, less information, and/or different information than shown in FIGS. 6A and 6B.

Figure 7A:
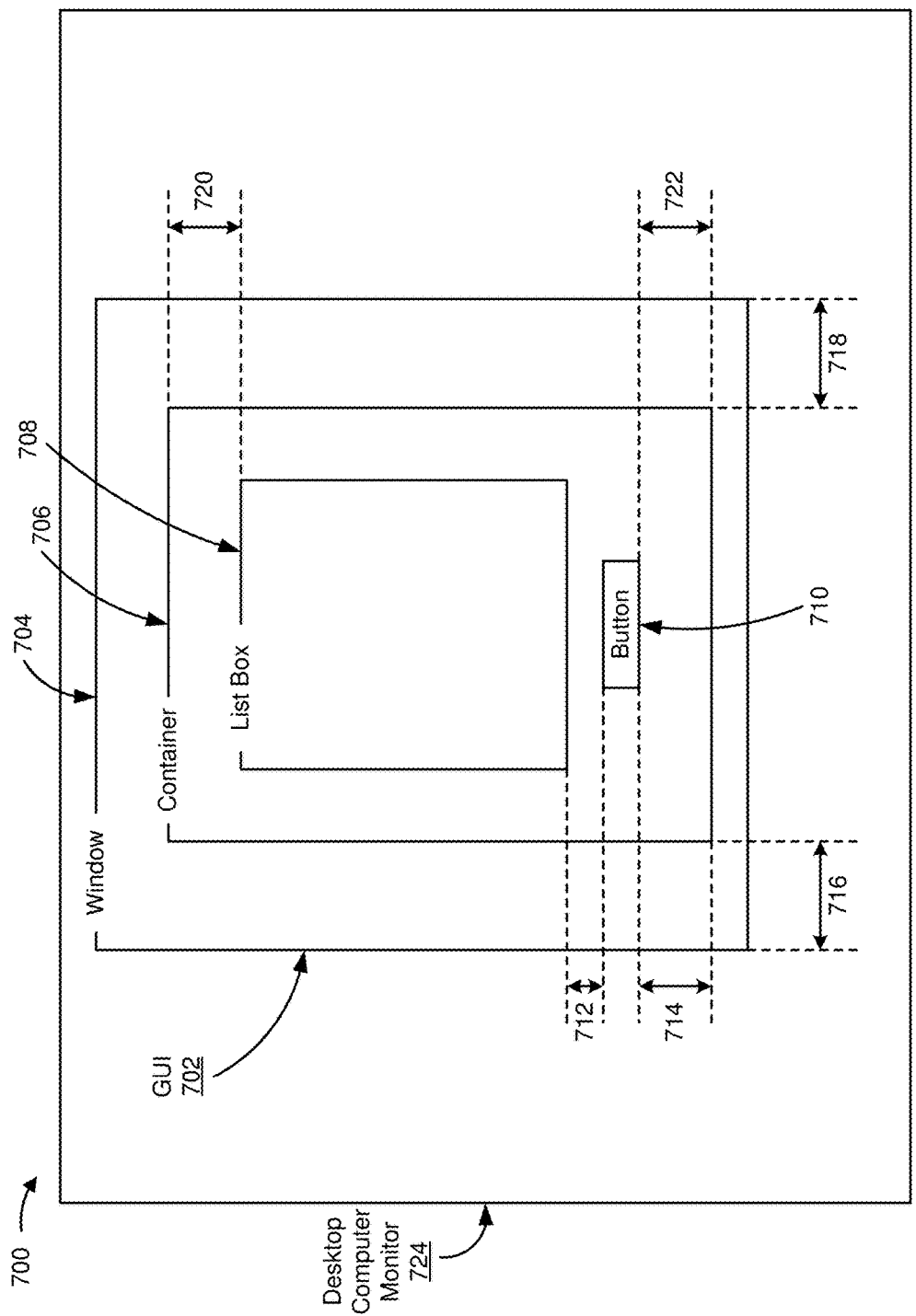
FIGS. 7A and 7B are diagrams of example implementations relating to the example process shown in FIG. 5.
Figure 7B:
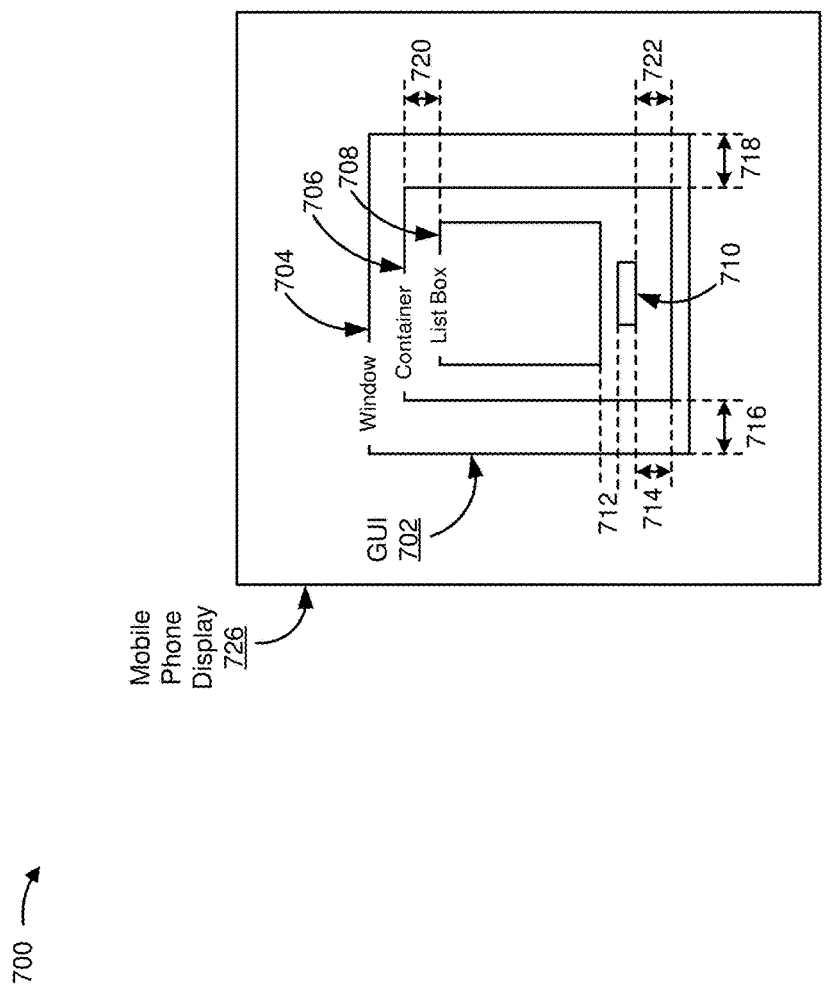

FIGS. 7A and 7B are diagrams of an example implementation 700 relating to process 500, shown in FIG. 5. FIG. 7A shows an example implementation of determining a containment relationship and a proximity relationship between elements included in a GUI. FIG. 7B shows an example implementation of maintaining the containment and proximity relationships when the GUI is changed.

As shown in FIG. 7A, a user may create a GUI 702 that includes one or more elements, such as a window 704, a container 706, a list box 708, and a button 710. GUI analyzer 420 may receive a trigger, and may analyze GUI 702, based on the trigger, to determine a containment relationship and/or a proximity relationship between two elements 704-710. As shown, GUI 702 may be displayed on a desktop computer monitor 724.

In some implementations, GUI analyzer 420 may determine a containment relationship between two or more elements. The containment relationship may include a first element being contained within a second element. GUI analyzer 420 may determine the containment relationship based on a border of the first element being within a border of the second element. For example, the borders of list box 708 and button 710 are contained within the borders of container 706 and window 704. As another example, the border of container 706 is contained within the border of window 704.

In some implementations, GUI analyzer 420 may determine the containment relationship between two elements based on coordinates associated with each element. For example, GUI analyzer 420 may determine that the coordinates for the border of the first element create a first shape that is contained within a second shape created by the coordinates of the border of the second element.

Additionally, or alternatively, GUI analyzer 420 may determine a proximity relationship between two or more elements. In some implementations, the proximity relationship may include a first element being positioned at a particular distance from a second element, or at a particular distance between a second element and a third element. For example, GUI analyzer 420 may determine a first distance between borders of button 710 and list box 708, as indicated by reference number 712, and may determine a second distance between borders of button 710 and container 706, as indicated by reference number 714. In some implementations, GUI analyzer 420 may determine that the second distance is larger than the first distance, and may generate a layout rule that maintains the proximity relationship when GUI 702 changes so that the second distance remains larger than the first distance. Additionally, or alternatively, GUI analyzer 420 may determine a ratio between the first distance and the second distance, and may generate a layout rule that maintains the ratio when GUI 702 changes.

Additionally, or alternatively, the proximity relationship may include a size of a margin that separates borders of two elements. For example, GUI analyzer 420 may determine a first margin size between borders of container 706 and window 704, as indicated by reference number 716, and may determine a second margin size between borders of container 706 and window 704, as indicated by reference number 718. In some implementations, GUI analyzer 420 may determine that the first margin size is equal to the second margin size (or different from the second margin size by less than a tolerance value), and may generate a layout rule that ensures the margins are of equal size when GUI 702 changes.

In some implementations, GUI analyzer 420 may infer a margin and/or a margin size based on two or more elements being contained within another element (e.g., a container element). For example, GUI analyzer 420 may infer that a margin exists between a container element and contained elements when more a border of more than one contained element is a particular distance from a border of the container element.

Additionally, or alternatively, the proximity relationship may include a size of a margin that separates a first element and a second element from a third element. In some implementations, the third element may contain the first and seconds elements. For example, GUI analyzer 420 may determine a first margin size between a border of list box 708 and container 706, as indicated by reference number 720, and may determine a second margin size between a border of button 710 and container 706, as indicated by reference number 722. In some implementations, GUI analyzer 420 may determine a ratio between the first margin size and the second margin size, and may generate a layout rule that maintains the ratio when GUI 702 changes.

FIG. 7B shows an implementation where GUI 702 is displayed on a mobile phone display 726, which may be a different size than desktop computer monitor 724. As shown, layout controller 430 maintains proximity relationships 712, 714, 716, 718, 720, and 722 between elements 704-710, and maintains containment relationships between elements 704-710, by applying layout rules to GUI 702 when GUI 702 is displayed on a display device with different characteristics than a display device on which GUI 702 is designed. When maintaining the proximity relationship, layout controller 430 may ensure that elements remain a particular distance from one another when GUI 702 changes. When maintaining the containment relationship, layout controller 430 may ensure that one element remains contained within another element when GUI 702 changes.

The particular elements, proximity relationships, containment relationships, and other information shown in FIGS. 7A and 7B are provided for explanatory purposes. In practice, layout management tool 225 may analyze and/or control additional information, less information, and/or different information than shown in FIGS. 7A and 7B.

Figure 8:
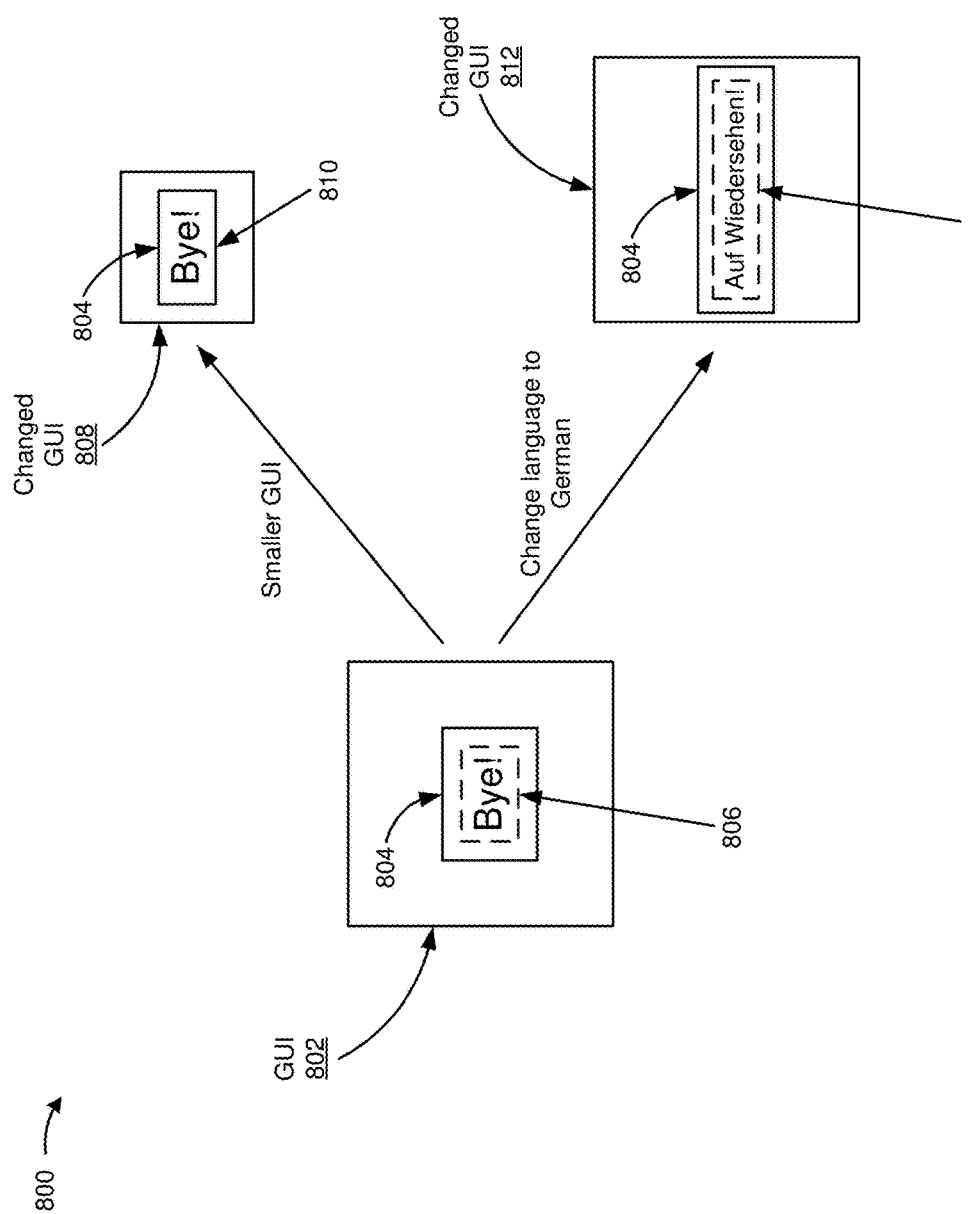
FIG. 8 is a diagram of example implementations relating to the example process shown in FIG. 5.

FIG. 8 is a diagram of an example implementation 800 relating to process 500, shown in FIG. 5. FIG. 8 shows an example implementation of determining and maintaining a text containment relationship between elements included in a GUI when the GUI changes.

As shown in FIG. 8, a user may create a GUI 802 that includes one or more elements, such as a button 804, and textual element 806. Textual element 806 may have a border that provides a margin around the text included in textual element 806, as indicated by the dotted line around textual element 806. GUI analyzer 420 may determine a containment relationship between button 804 and textual element 806 (e.g., as described herein in connection with FIG. 7A). For example, GUI analyzer 420 may determine that textual element 806 is contained within button 804 when the border of textual element 806 is within the border of button 804.

In some implementations, the border of textual element 806 may specify a minimum size of an element, a maximum size of the element, a resizability of the element, or the like that contains textual element 806 (e.g., button 804). Additionally, or alternatively, GUI analyzer 430 may specify the border of textual element 806 by specifying a margin size around the text included in textual element 806 (e.g., based on coordinates and/or pixels).

As further shown in FIG. 8, GUI 802 may be reduced in size to a smaller GUI, such as changed GUI 808. Based on the change in size to GUI 802, layout controller 430 may reduce the size of button 804 to fit within changed GUI 808. In some implementations, layout controller 430 may maintain the containment relationship based on borders, distances, margin size, etc., as discussed herein in connection with FIGS. 7A and 7B. Additionally, or alternatively, layout controller 430 may reduce the size of button 804 until button 804 is the minimum size specified by the border of textual element 806. In some implementations, layout controller 430 may further reduce the size of button 804 by changing a font size of text included in textual element 806 and/or by truncating the text included in textual element 806.

As still further shown in FIG. 8, a language used to display elements included in GUI 802 may be changed. For example, GUI 802 may be changed to changed GUI 812 by changing the language of GUI 802 to German. As shown, the border of textual element 806 may be adjusted (e.g., based on a default and/or minimum margin around the text, as specified by GUI analyzer 420), as indicated by textual element 814. As further shown, layout controller 430 may maintain a distance between button 804 and the border of textual element 814 to be the same as the distance between button 804 and the border of textual element 806.

The particular elements, containment relationships, and other information shown in FIG. 8 are provided for explanatory purposes. In practice, layout management tool 225 may analyze and/or control additional information, less information, and/or different information than shown in FIG. 8.

Figure 9B:
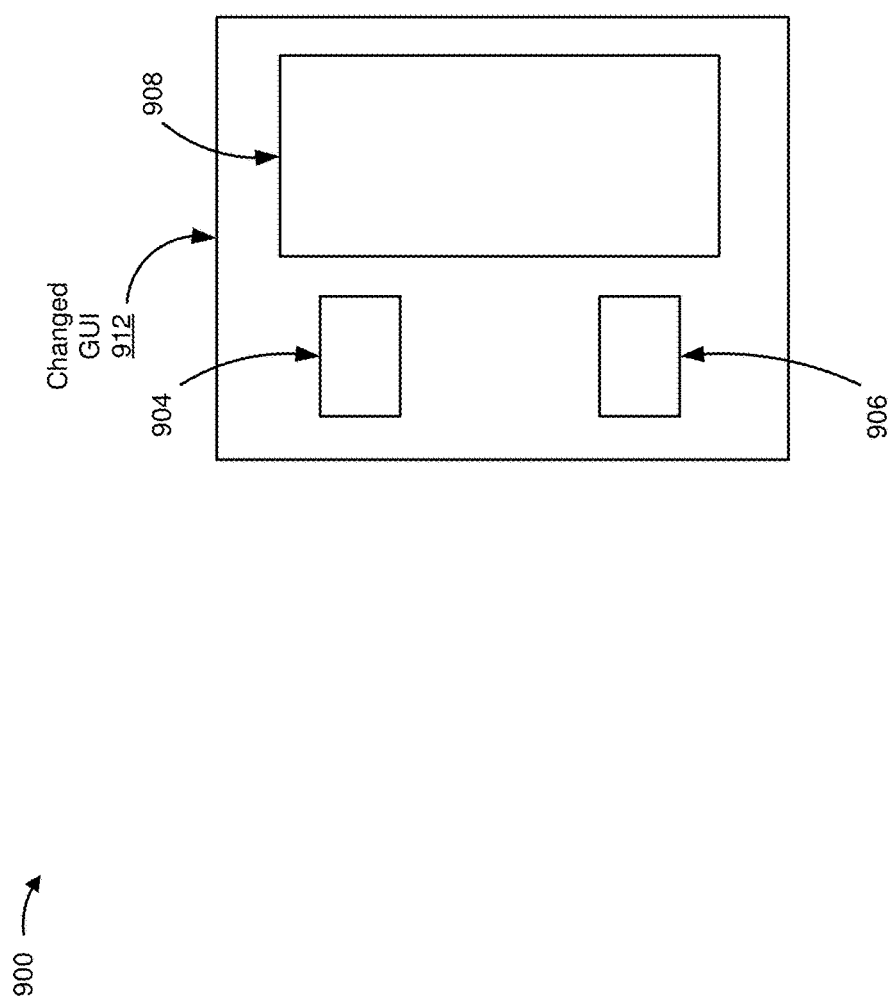

FIGS. 9A and 9B are diagrams of an example implementation 900 relating to process 500, shown in FIG. 5. FIG. 9A shows an example implementation of determining an element type relationship and a size relationship between elements included in a GUI. FIG. 9B shows an example implementation of maintaining the size relationship when the GUI is changed.

As shown in FIG. 9A, a user may create a GUI 902 that includes one or more elements 904-908. GUI analyzer 420 may receive a trigger, and may analyze GUI 902, based on the trigger, to determine an element type relationship and/or a size relationship between two elements 904-908.

In some implementations, GUI analyzer 420 may determine an element type relationship between two or more elements. The element type relationship may include two elements being a same element type, or a different element type. For example, GUI analyzer 420 may determine that element 904 and 906 are a same element type (e.g., a button), and may determine that elements 904 and 906 have a different element type than element 908 (which may be, for example, a graphical element). Additionally, or alternatively, GUI analyzer 420 may determine that two or more elements are a same element type when the elements use a same or similar color, line style, background image, font, font size, font style, etc., and/or may determine that two or more elements are a different element type when the elements use a different color, line style, background image, font, font size, font style, etc.

Additionally, or alternatively, GUI analyzer 420 may determine a size relationship between two or more elements. For example, GUI analyzer 420 may determine a ratio of a size of two elements (e.g., a ratio of a length, height, area, radius, etc. of each of the elements), and layout controller 430 may maintain the ratio when GUI 902 changes. In some implementations, the size relationship may be based on the element type relationship. For example, GUI analyzer 420 may determine that two elements with the same element type are the same size, and may generate a layout rule for layout controller 430 that ensures that the two elements are the same size when GUI 902 changes. As another example, GUI analyzer 420 may generate a layout rule for layout controller 430 that ensures that a first element of a first element type is displayed with a larger size, a smaller size, and/or a same size as a second element of a second element type.

In some implementations, GUI analyzer 420 may generate a layout rule to display an element of a particular element type as large as possible or as small as possible. In some implementations, the window that contains the GUI may be an element. For example, GUI analyzer 420 may determine that a particular element of a particular element type is to be displayed as large as possible on the GUI, using a proximity relationship between the particular element and the window that contains the GUI (e.g., the GUI border). Additionally, or alternatively, GUI analyzer 420 may generate a layout rule to maintain a size of an element (e.g., based on an element type of the element).

When GUI analyzer 420 determines that two elements are the same size, GUI analyzer 420 may compare any combination of size measurements, such as a length, height, area, radius, etc., of the two elements. For example, GUI analyzer 420 may determine that two elements are a same size if the length of each element is the same, and a height of each element is the same. In some implementations, GUI analyzer 420 may determine that two elements are the same size when a difference in size measurements for the two elements is within a tolerance size (e.g., satisfies a tolerance value). For example, reference number 910 indicates a tolerance size for elements 904 and 906. GUI analyzer 430 may determine that elements 904 and 906 are the same size when elements 904 and 906 have a size that satisfies a lower tolerance value and an upper tolerance value, as indicated by reference number 910.

FIG. 9B shows an implementation where GUI 902 is displayed in a smaller size, as indicated by changed GUI 912. As shown, layout controller 430 maintains size relationships between elements 904-908 (which may be based on element type relationships), by applying layout rules to GUI 902 when GUI 902 changes size, as shown by GUI 912.

The particular elements, element type relationships, size relationships, and other information shown in FIGS. 9A and 9B are provided for explanatory purposes. In practice, layout management tool 225 may analyze and/or control additional information, less information, and/or different information than shown in FIGS. 9A and 9B.

Figure 10A:
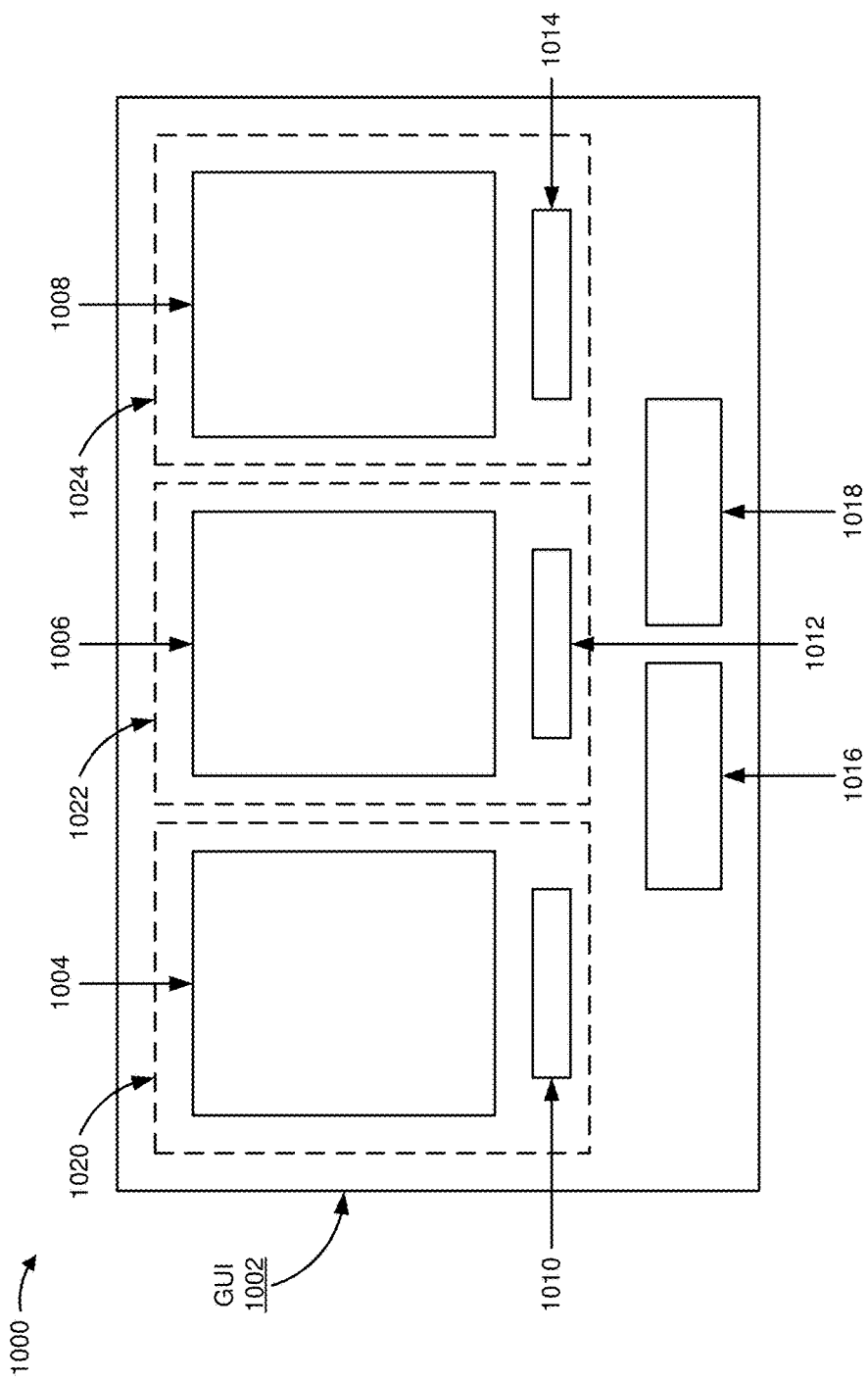

FIGS. 10A and 10B are diagrams of an example implementation 1000 relating to process 500, shown in FIG. 5. FIG. 10A shows an example implementation of determining a group relationship between elements included in a GUI. FIG. 10B shows an example implementation of displaying the elements based on the group relationship when the GUI is changed.

As shown in FIG. 10A, a user may create a GUI 1002 that includes one or more elements 1004-1018. GUI analyzer 420 may receive a trigger, and may analyze GUI 1002, based on the trigger, to determine a group relationship between two elements 1004-1018.

In some implementations, GUI analyzer 420 may determine a group relationship based on another relationship, such as an element type relationship, an alignment relationship, a proximity relationship, a size relationship, etc. For example, GUI analyzer 420 may group elements 1004-1008 based on a determination that elements 1004-1008 are the same element type, are aligned (e.g., at a top border, a bottom border, a center, etc.), are evenly spatially distributed, etc. Likewise, GUI analyzer 420 may group elements 1010-1014 for similar reasons. Additionally, GUI analyzer 420 may group elements 1016 and 1018 for similar reasons. Additionally, or alternatively, GUI analyzer 420 may group elements that use a same or similar color, line style, background image, font, font size, font style, etc.

Additionally, or alternatively, GUI analyzer 420 may group element 1004 and element 1010 into group 1020, may group element 1006 and element 1012 into group 1022, and may group element 1008 and element 1014 into group 1024, based, for example, on a proximity relationship, an alignment relationship, etc. In some implementations, GUI analyzer 420 may group elements into groups by placing a set of similar elements (e.g., based on a position, a size, an element type, a relationship, etc. of the elements) in each group. For example, groups 1020-1024 each contain a first element of a first element type (e.g., elements 1004-1008) that each share a relationship (e.g., a proximity and alignment relationship) with a second element of a second element type (e.g., elements 1010-1014). In some implementations, a group may include a single element. For example, elements 1004, 1006, and 1008 may be placed into separate groups, and may be the only elements of the separate groups.

FIG. 10B shows an implementation where GUI 1002 is displayed in a smaller size, as indicated by changed GUI 1026. As shown, layout controller 430 may create a display switching element 1028 (e.g., a tab, a menu item, a button, etc.) for each group identified by a group relationship. In some implementations, user selection of a display switching element 1028 may cause a corresponding group to be displayed. For example, tab 1 may cause elements 1004 and 1010 (group 1020) to be displayed on changed GUI 1026, tab 2 may cause elements 1006 and 1012 (group 1022) to be displayed on changed GUI 1026, and tab 3 may cause elements 1008 and 1014 (group 1024) to be displayed on changed GUI 1026. Because elements 1016 and 1018 were not grouped into groups 1020, 1022, and/or 1024, elements 1016 and 1018 may be displayed regardless of which display switching element 1028 is selected. Additionally, or alternatively, layout controller 430 may create two tabs, one for each element 1016 and 1018.

The particular elements, group relationships, and other information shown in FIGS. 10A and 10B are provided for explanatory purposes. In practice, layout management tool 225 may analyze and/or control additional information, less information, and/or different information than shown in FIGS. 10A and 10B.

Implementations described herein may more effectively control the manner in which elements are displayed on a GUI when the GUI is changed, by inferring layout relationships based on the GUI layout, generating layout rules that maintain the layout relationships, and using the generated layout rules to control the GUI layout when the GUI is changed.

Figure 11:
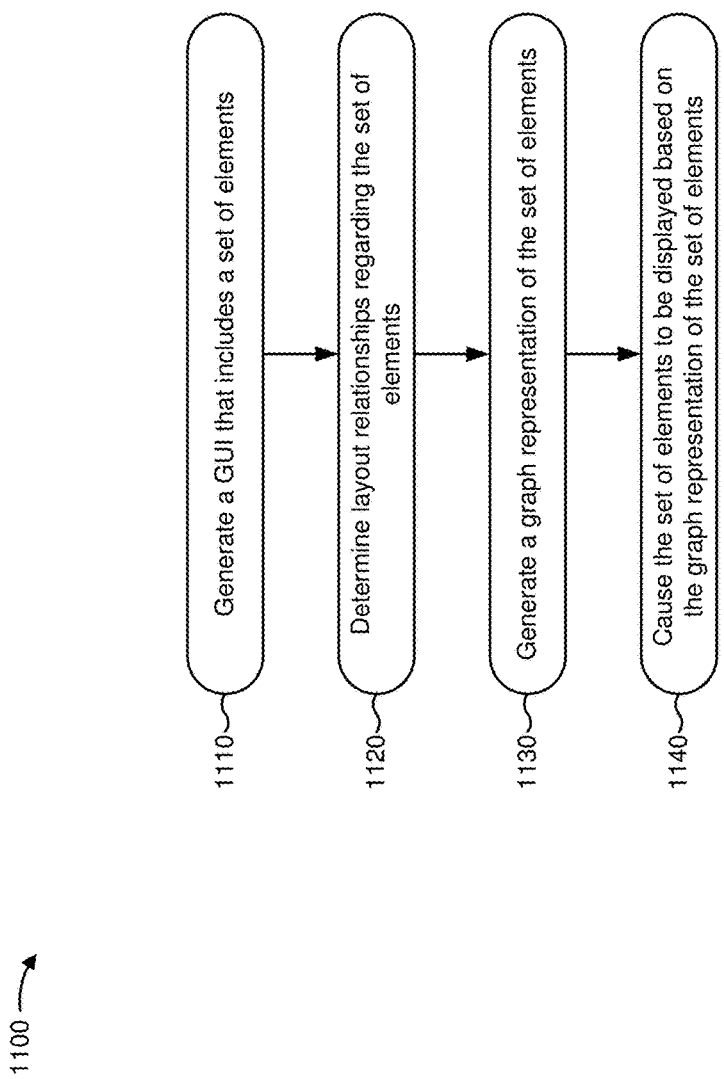
FIG. 11 is a flow chart of an example process for utilizing a graph to facilitate displaying the GUI.

FIG. 11 is a flow chart of an example process 1100 for utilizing a graph representation of a GUI to facilitate displaying the GUI. In some implementations, one or more process blocks of FIG. 11 may be performed by client device 210 (e.g., layout management tool 225). Additionally, or alternatively, one or more process blocks of FIG. 11 may be performed by another device or a set of devices separate from or including client device 210, such as server device 230. A graph representation (e.g., a graph) may refer to a graphical, textual, and/or mathematical representation of the GUI. For example, a graph may represent elements of a GUI as vertices and layout relationships as edges. Although implementations, described herein, are described in terms of a graphical graph, another data structure and/or representation may be utilized.

As shown in FIG. 11, process 1100 may include generating a GUI that includes a set of elements (block 1110). For example, client device 210 may generate the GUI that includes the set of elements. The set of elements, as described herein with regard to FIG. 4, of a GUI, may include elements of a GUI such as windows, text boxes, containers, labels, buttons, or the like. In some implementations, a user may utilize a first GUI to generate a second GUI. For example, client device 210 may provide, for display, a first GUI that includes one or more elements associated with designing a second GUI, such as a set of buttons allowing for adding elements to the second GUI, a workspace for designing the second GUI, or the like, as discussed in detail with regard to FIG. 12.

As further shown in FIG. 11, process 1100 may include determining layout relationships regarding the set of elements (block 1120). For example, client device 210 may determine information, such as the layout relationships, attributes associated with the layout relationships, layout rules associated with the layout relationships, or the like, regarding the set of elements. In some implementations, client device 210 may determine information, such as a resizability of an element represented by a resize factor (e.g., a representation of an extent to which an element may expand or contract when the GUI expands or contracts in comparison to one or more other elements of the GUI), a type of an element, or the like. In some implementations, client device 210 may determine the layout relationships (e.g., the alignment relationships, etc.) based on analyzing the GUI, as described herein with regard to FIG. 5. For example, client device 210 may receive a trigger to analyze a GUI, such as receiving an indication that the GUI is being resized, receiving an instruction that the GUI is being displayed on a device with a particular screen size, resolution, or the like. Client device 210 may determine, based on receiving the trigger, the layout relationships and/or information associated therewith, such as a set of locations associated with an element. For example, client device 210 may determine a center-point of the element, a boundary of the element, or the like, and determine one or more layout relationships based on the center-point of the element, the boundary of the element, or the like. Additionally, or alternatively, client device 210 may utilize pre-determined information regarding the element (e.g., attributes of the element, such as a boundary, a center-point, etc.) and generate the one or more layout relationships. In some implementations, a location associated with an element may be expressed in terms of a particular coordinate system, such as a pixel-based coordinate system or the like, a set of attributes associated with an element, or the like.

As further shown in FIG. 11, process 1100 may include generating a graph representation of the set of elements (block 1130). For example, client device 210 may generate the graph representation (e.g., a graph) of the set of elements. The graph representation may refer to a directed graph that includes a set of vertices and a set of edges. The set of vertices may correspond to some or all of the set of elements. For example, a vertex may correspond to an alignment point of an element, such as a center-point, a boundary, or the like. The set of edges may correspond to layout relationships. For example, an edge may correspond to an alignment relationship, a spacing relationship, a containment relationship, or the like.

Figure 13A:
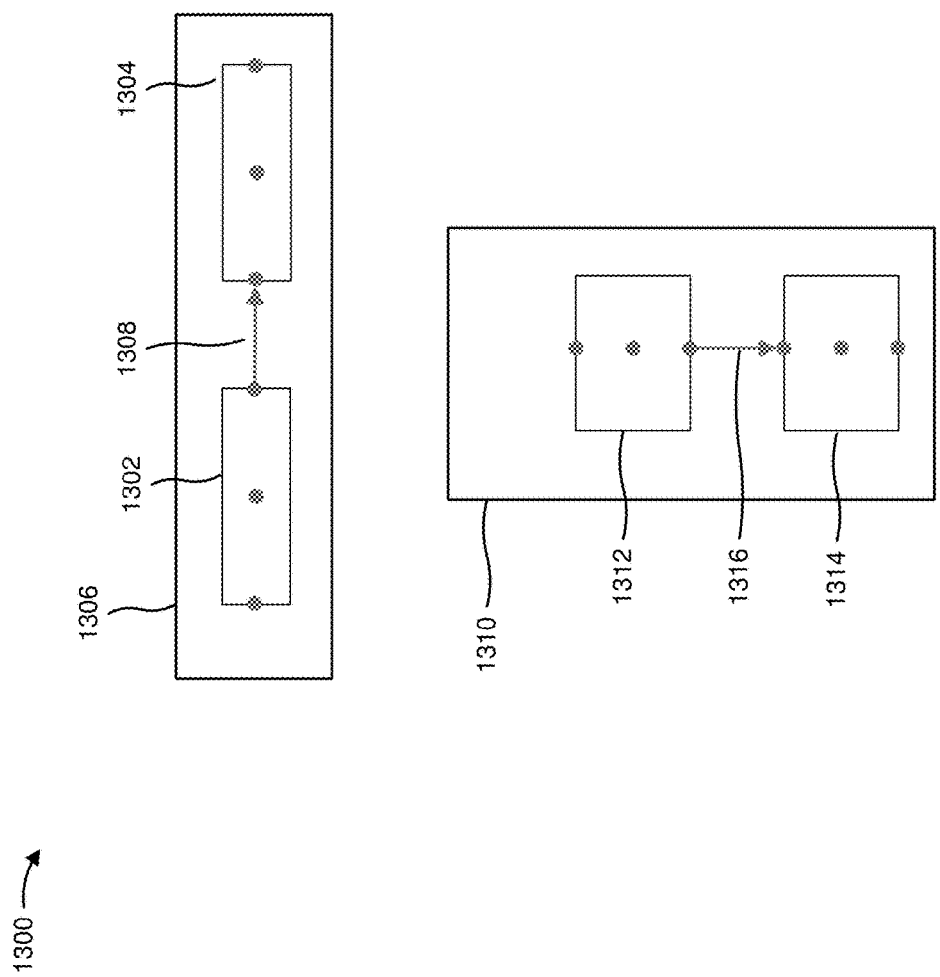
FIGS. 13A-13C are diagrams of example implementations relating to the example process shown in FIG. 12.
Figure 13B:
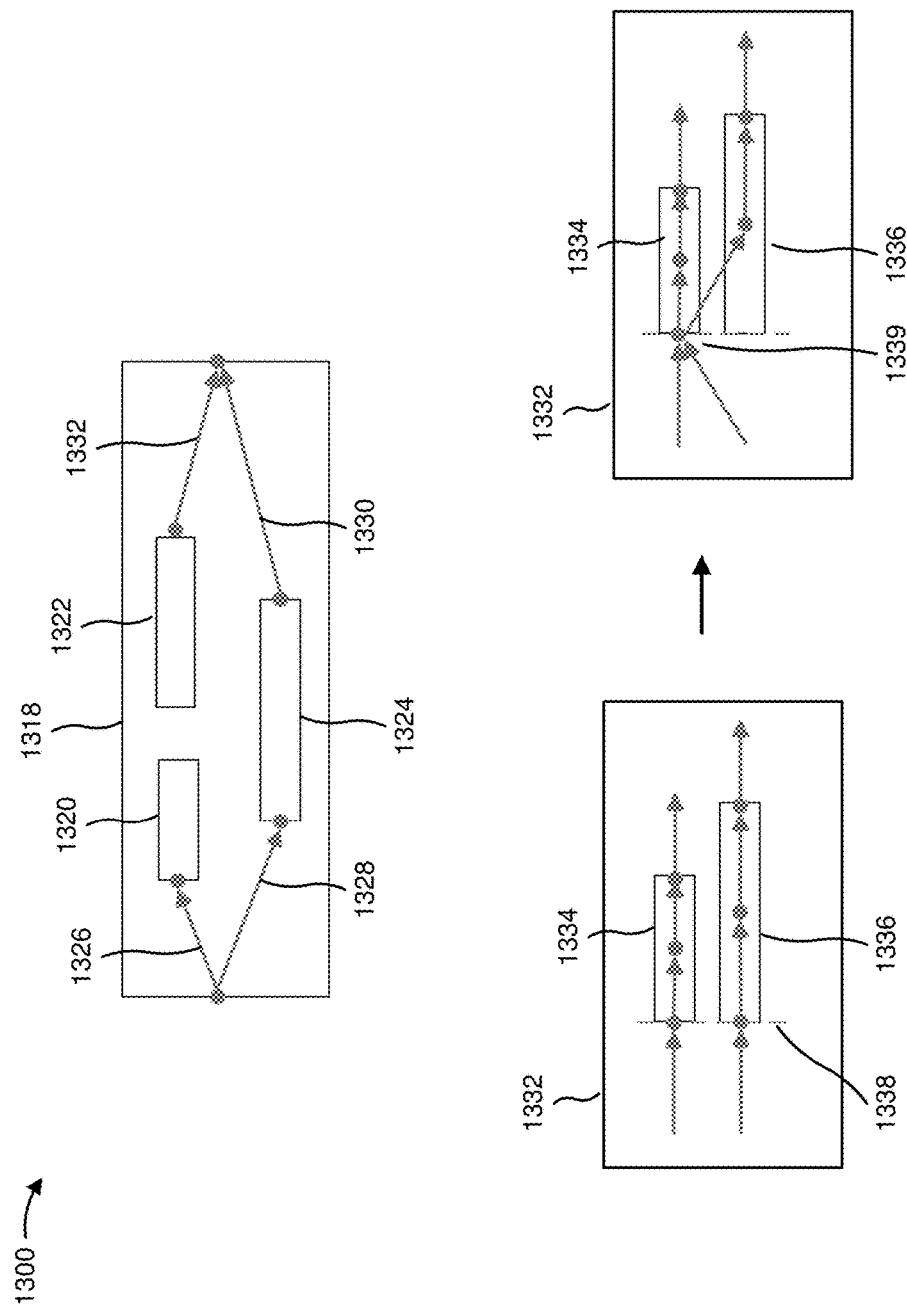
Figure 13C:
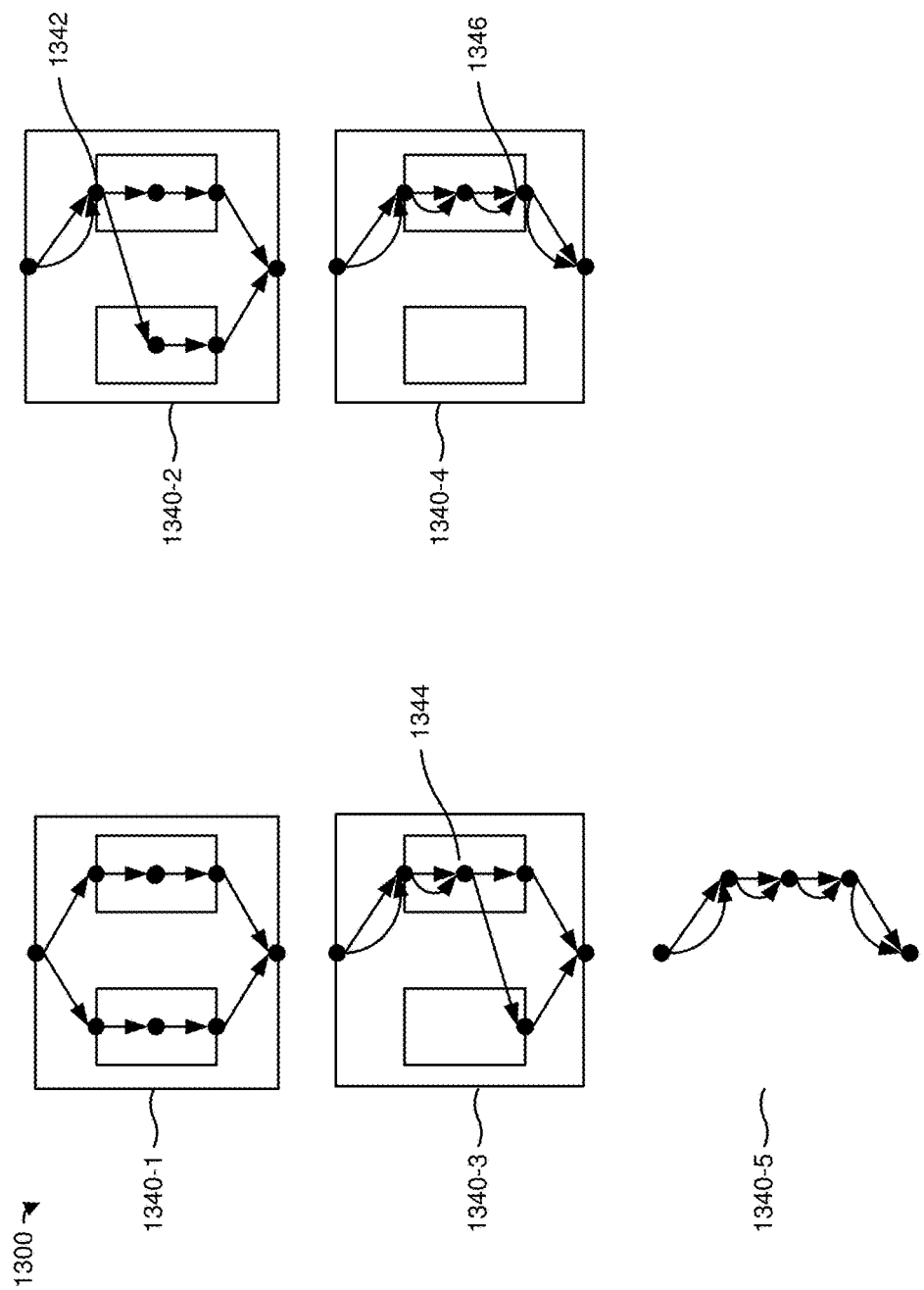

In some implementations, client device 210 may generate a horizontal graph representation (e.g., a graph that may be a visual graph, a textual graph, or another type of data structure) for the set of elements, as described herein with respect to FIGS. 13A-13C. For example, client device 210 may generate a first set of vertices representing left boundaries of elements of the set of elements, a second set of vertices representing center-points of the elements, and a third set of vertices representing right boundaries of the elements. Additionally, or alternatively, client device 210 may generate a vertical graph representation for the set of elements. For example, client device 210 may generate a first set of vertices representing upper boundaries of elements of the set of elements, a second set of vertices representing center-points of the elements, and a third set of vertices representing lower boundaries of the elements.

In some implementations, client device 210 may generate multiple graph representations, such as a horizontal graph representation representing horizontal boundaries of elements and a vertical graph representation representing vertical boundaries of elements. Additionally, or alternatively, client device 210 may generate another type of graph representation, such as a graph representation including a set of vertices representing other portions of an element, such as a corner of an element, an interior element of an element, or the like. Additionally, or alternatively, client device 210 may generate multiple vertices representing the same portion of an element, such as multiple vertices representing the left boundary of an element.

In some implementations, client device 210 may obtain one or more graph representations from a data storage, from another client device 210, or the like. For example, when a graph representation has been generated for the GUI, client device 210 may obtain the graph representation and may utilize the graph representation, modify the graph representation, replace the graph representation, or the like.

Client device 210 may generate a set of edges that connects multiple vertices, of the set of vertices, to represent a layout relationship (e.g., a collision relationship), in some implementations. A collision relationship may refer to a relationship between multiple elements that may collide if increased in size with respect to the GUI (e.g., two or more aligned elements, two or more near-aligned elements, or the like). For example, for a set of vertices representing left boundaries, right boundaries, and center-points of multiple elements, client device 210 may connect a first vertex of a first element and a second vertex of a second element to form an edge if the first element can collide with the second element by extending the first element horizontally. In this way, an edge may represent a spacing between a first element and a second element that are aligned. A collision relationship is described in detail with regard to FIG. 13A.

Additionally, or alternatively, client device 210 may generate a set of edges to connect multiple vertices, of the set of vertices, to represent an internal relationship. For example, client device 210 may connect a first vertex representing a left boundary of an element and a second vertex representing a right boundary of the element to form an edge. In this way, an edge may represent an internal spacing between boundaries of an element. Additionally, or alternatively, client device 210 may represent other layout relationships with edges, such as alignment relationships, orientation relationships, containment relationships, or the like.

Client device 210 may merge vertices based on an alignment relationship, in some implementations. For example, when a first vertex of a first element and a second vertex of a second element share an alignment relationship (e.g., alignment relationship 620 of FIG. 6A and discussed herein with regard to FIG. 5), client device 210 may merge the first vertex and the second vertex into a single vertex of the graph representation of the set of elements (e.g., as described herein with regard to FIG. 13C). In this case, client device 210 may identify a set of edges that connect to the first vertex, may reconnect the set of edges to the second vertex, and may remove the first vertex. In this way, alignment relationships associated with the set of elements are preserved when vertices are relocated during resizing.

Figure 14A:
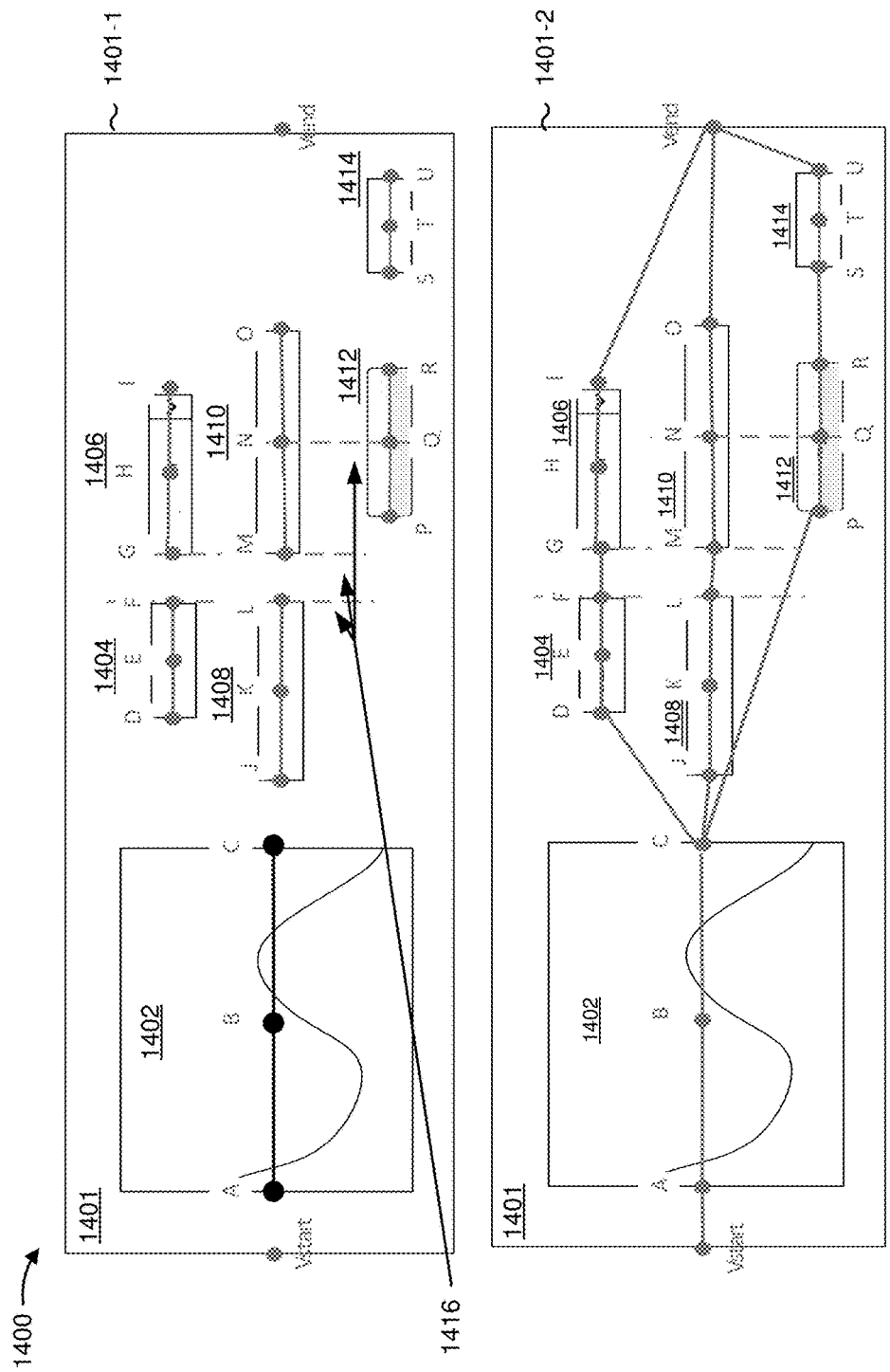
FIGS. 14A-14O are diagrams of example implementations relating to the example process shown in FIG. 12.
Figure 14B:
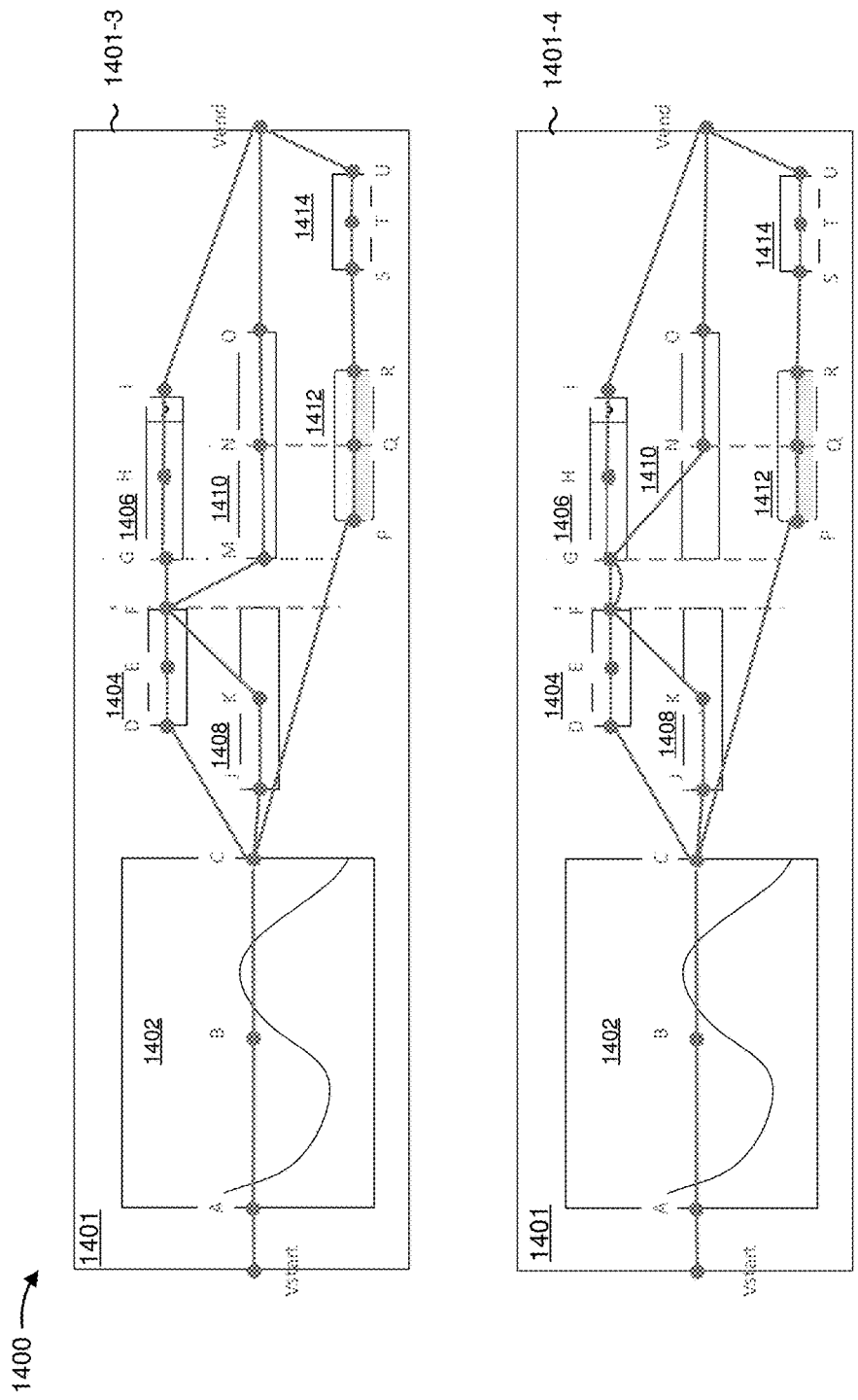
Figure 14C:
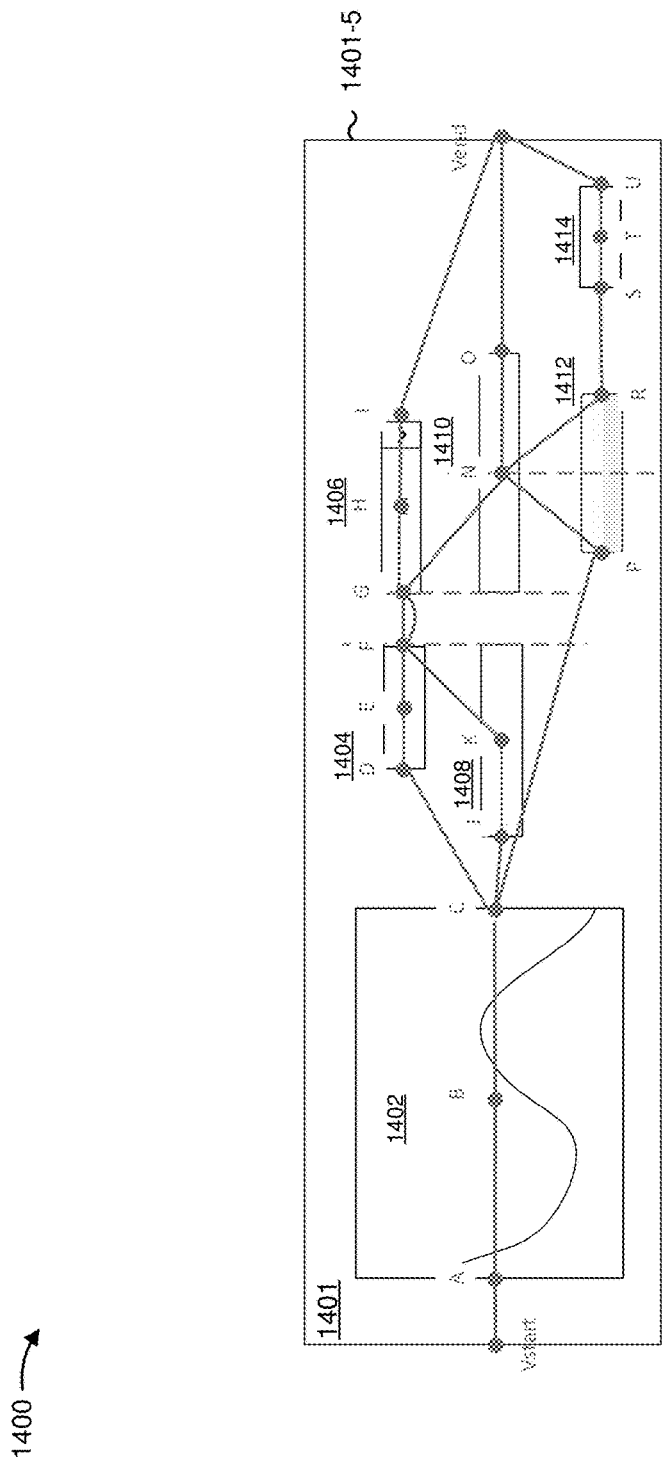
Figure 14D:
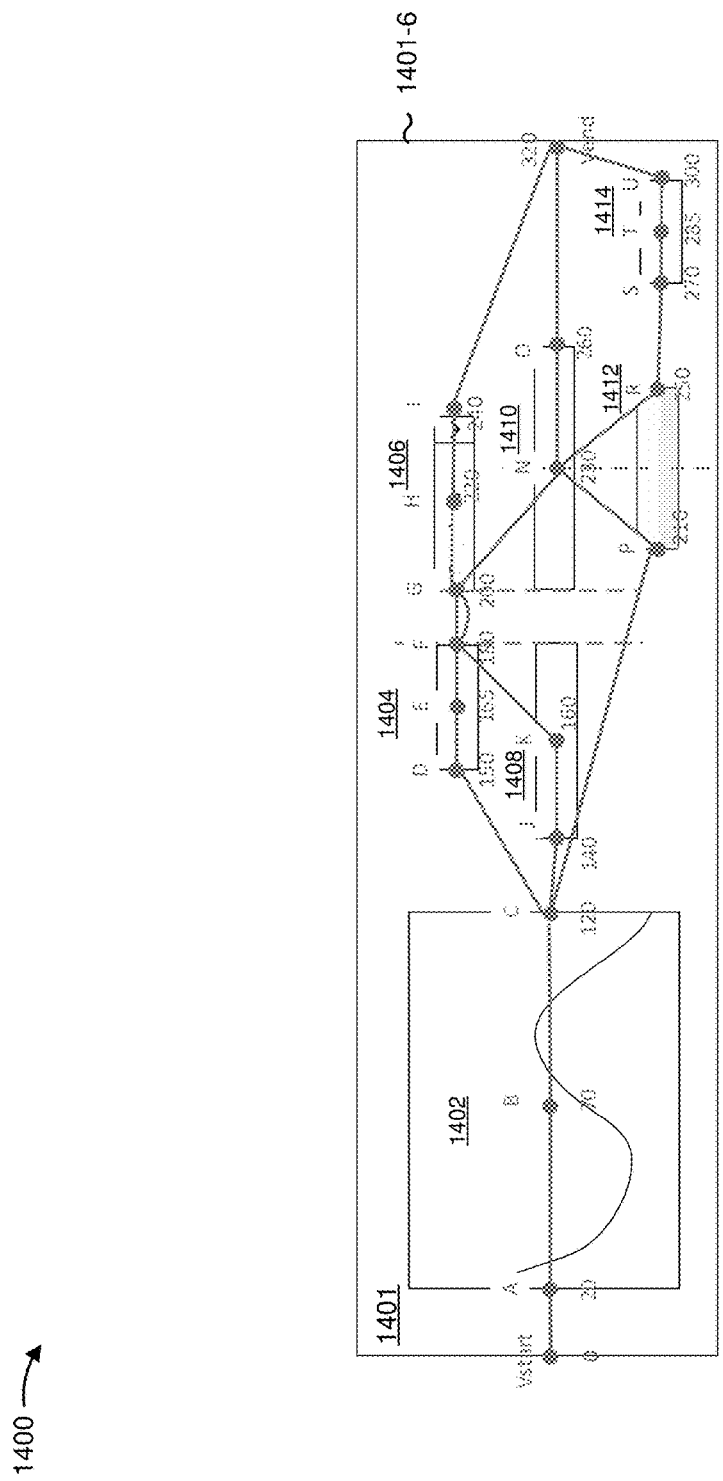
Figure 14E:
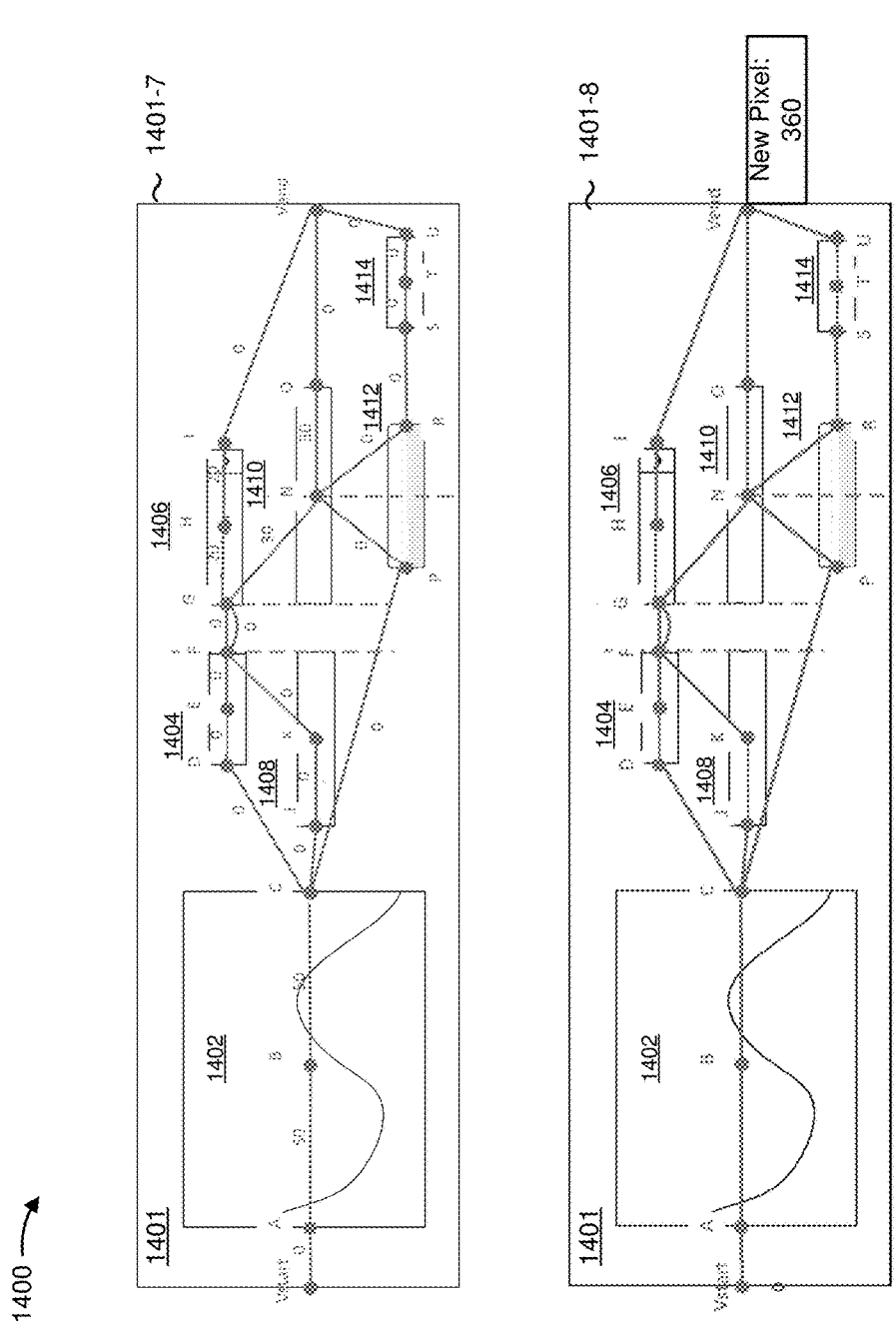
Figure 14F:
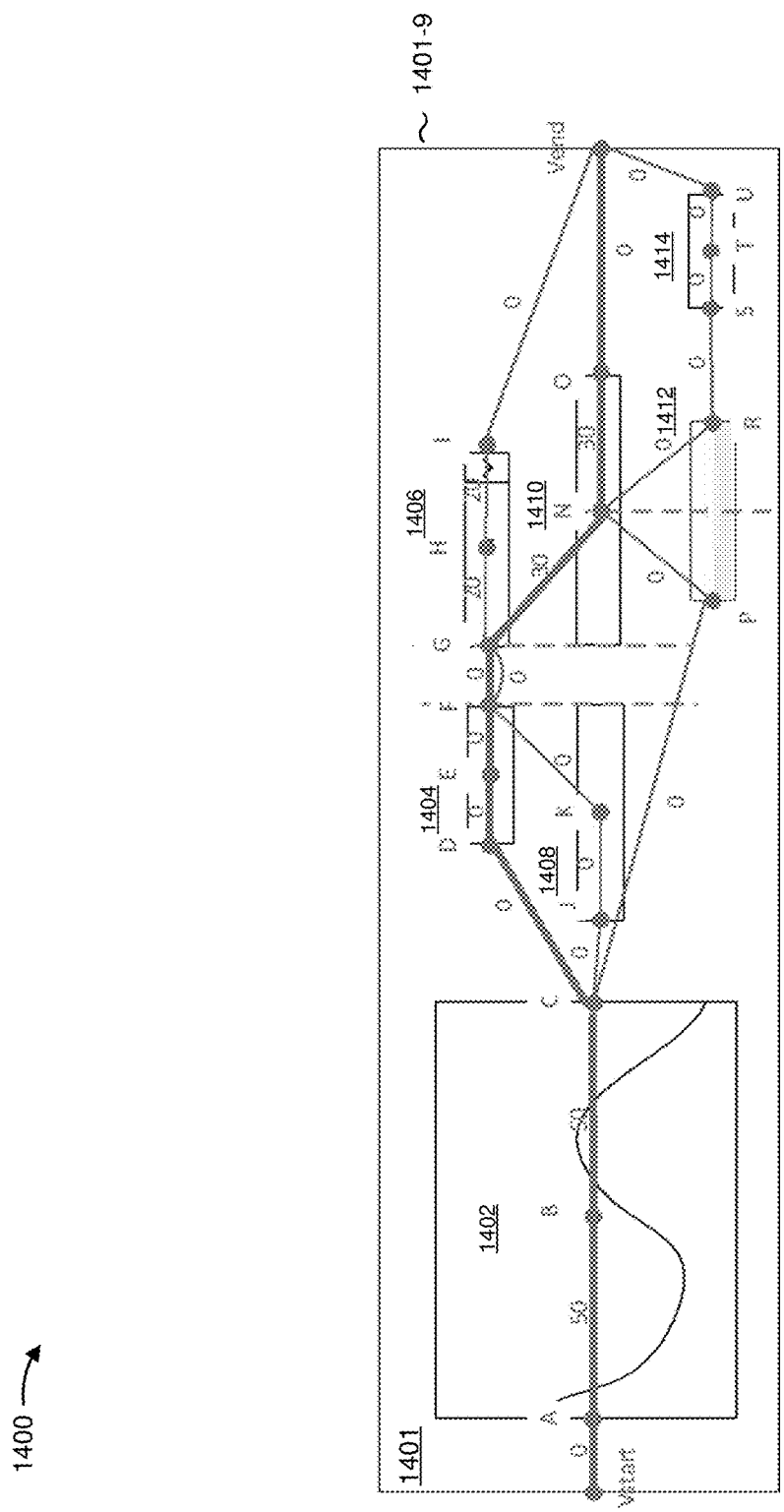
Figure 14G:
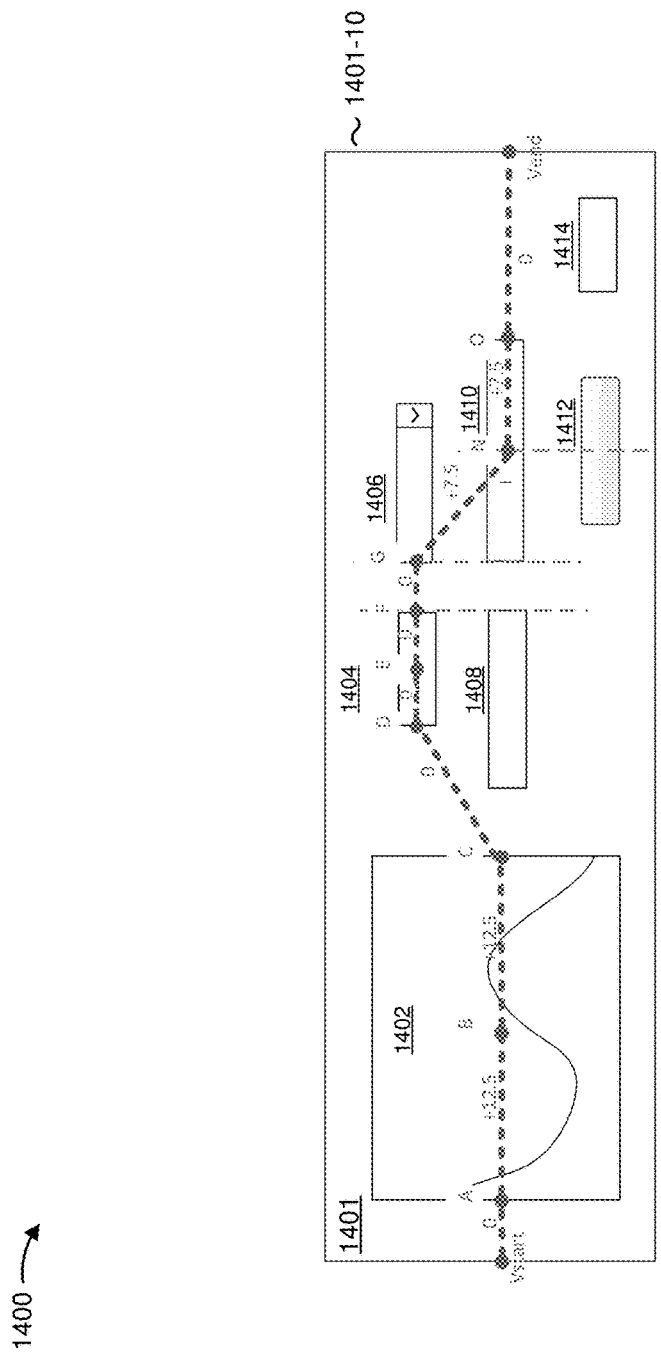
Figure 14H:
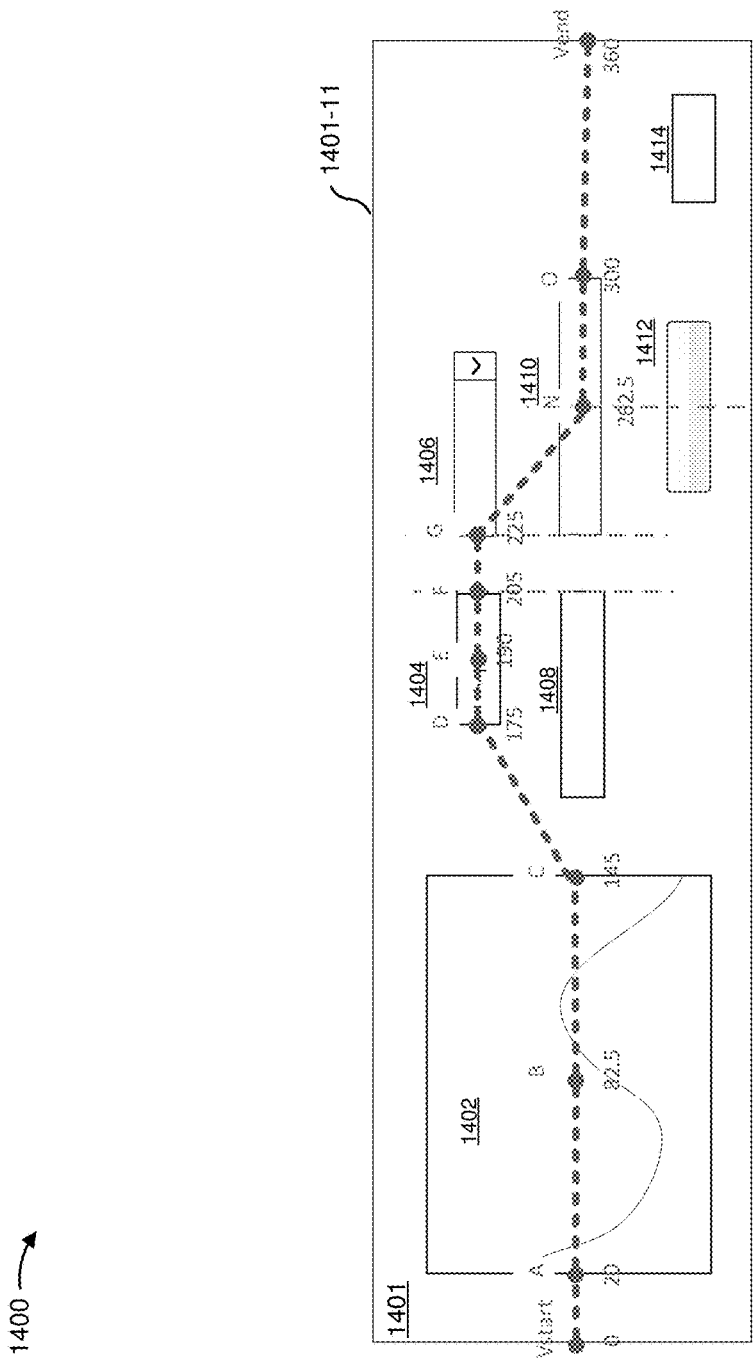
Figure 14I:
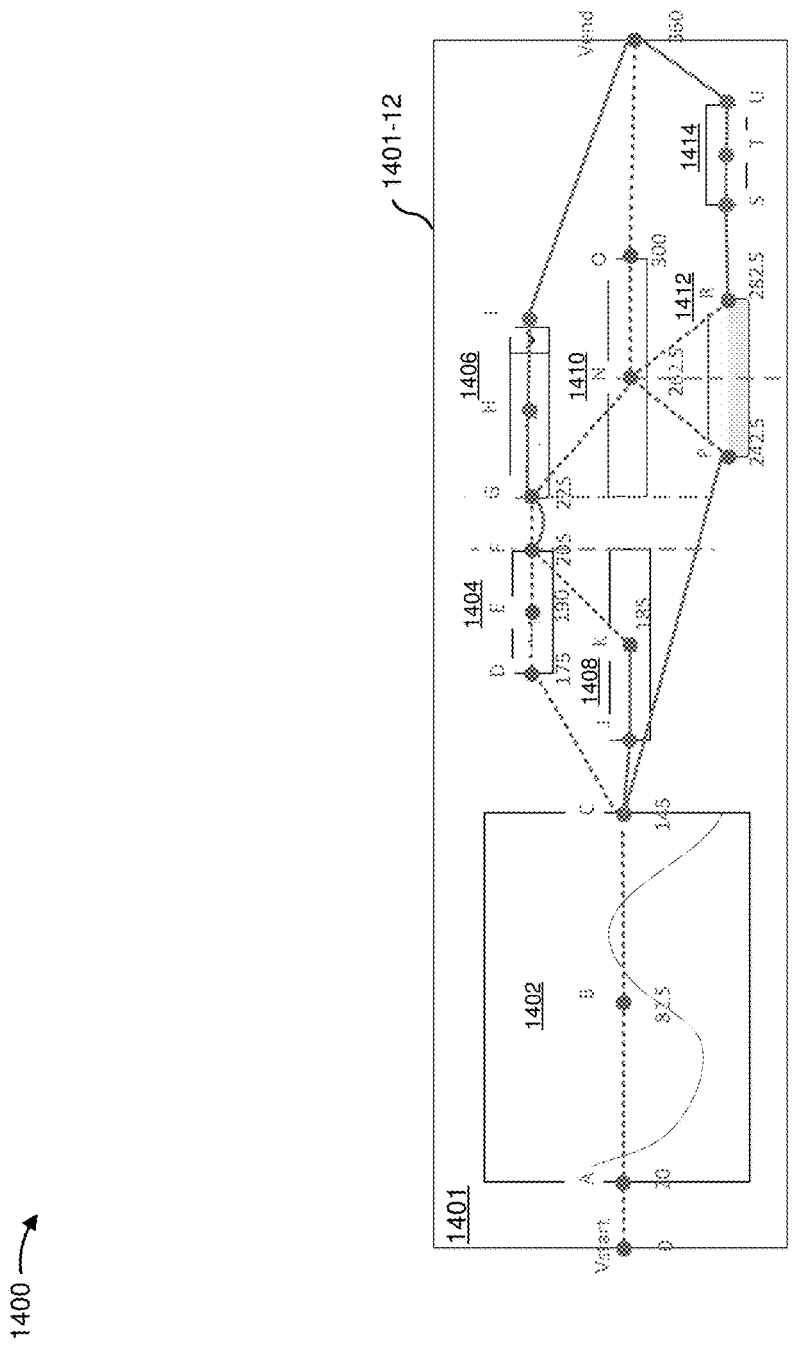
Figure 14J:
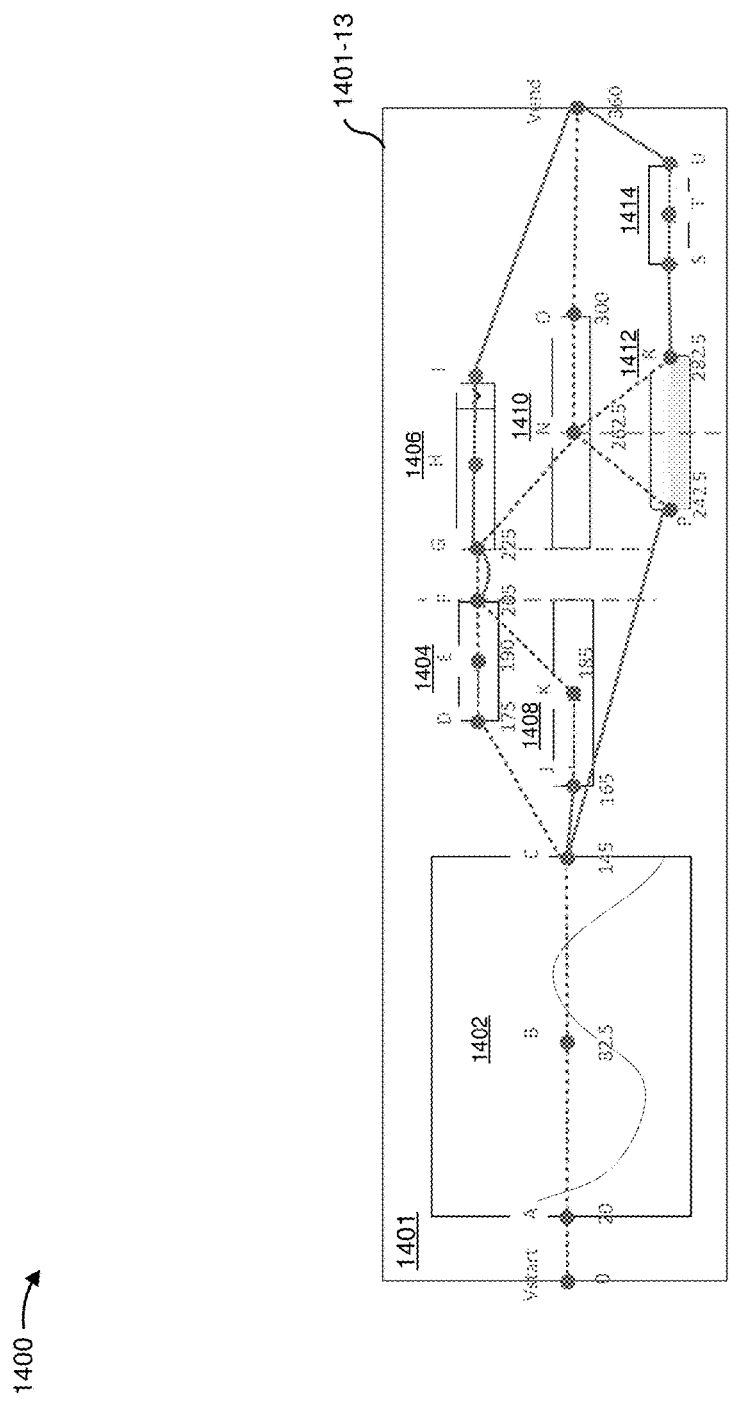
Figure 14K:
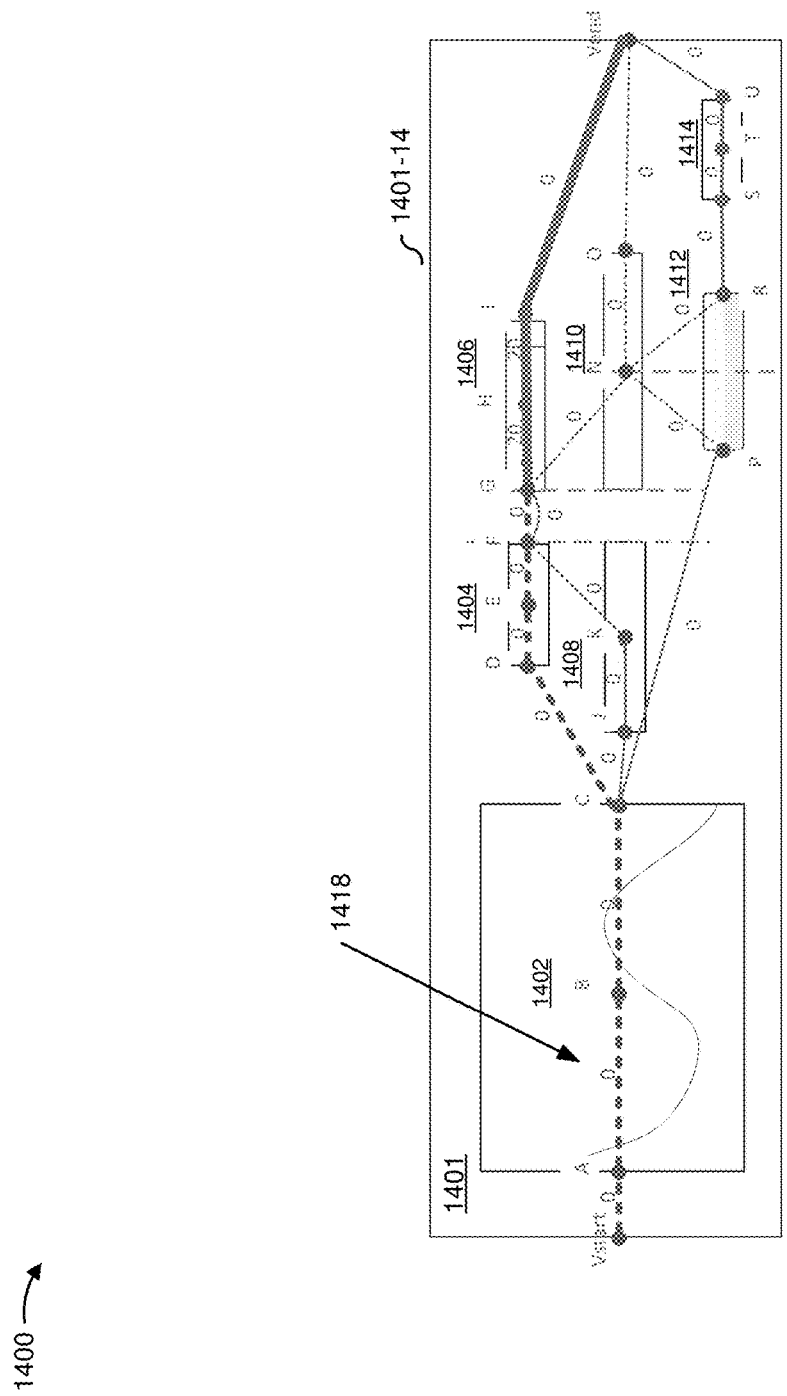
Figure 14L:
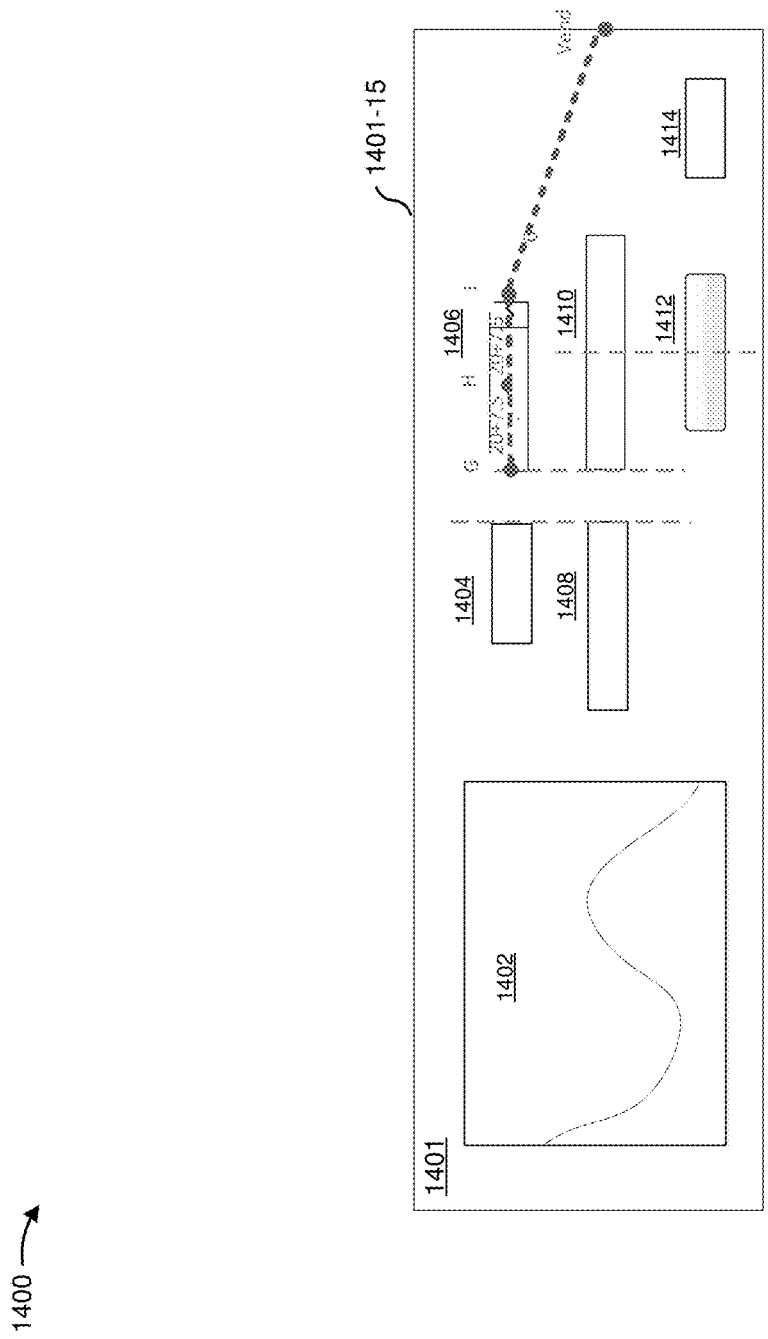
Figure 14M:
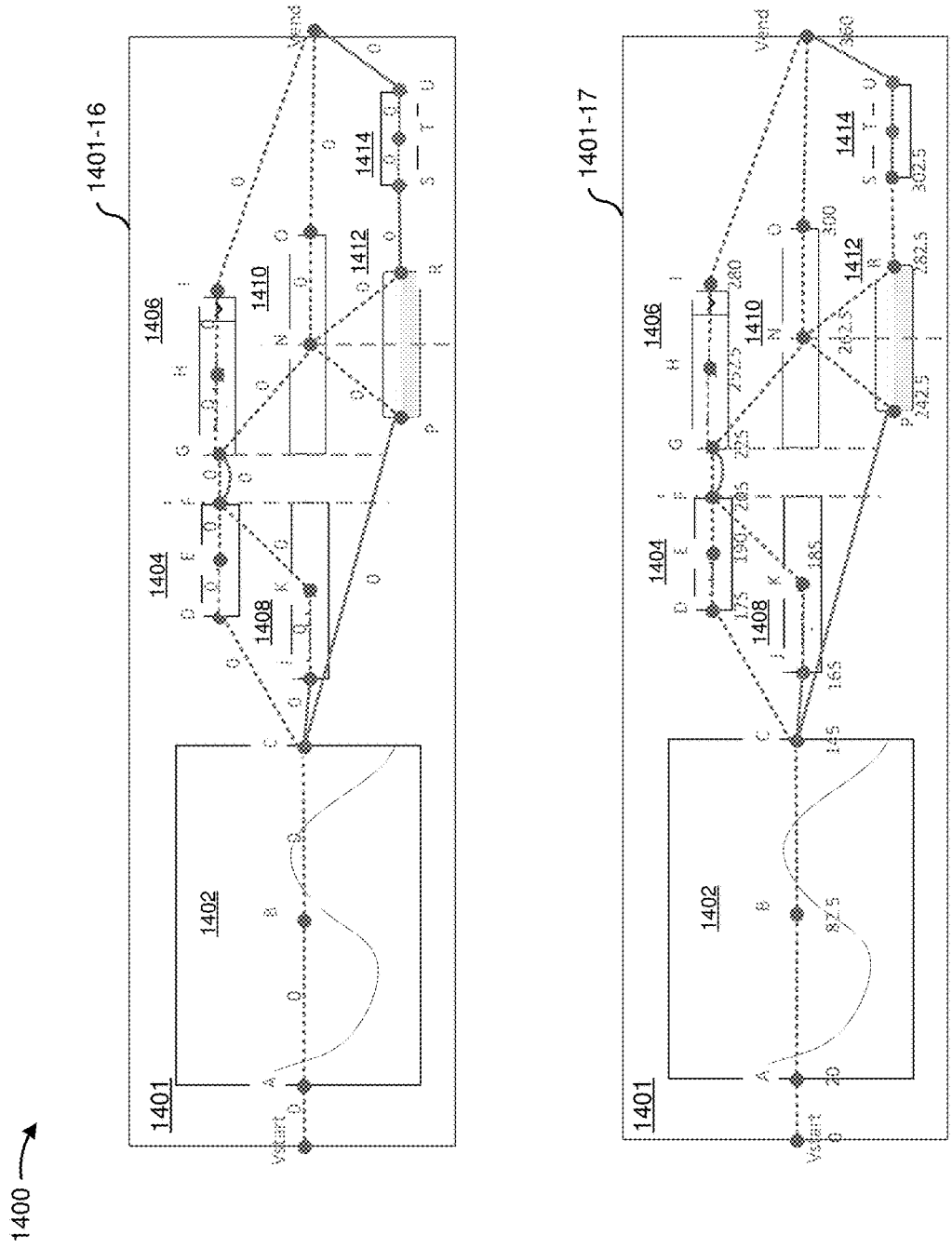
Figure 14N:
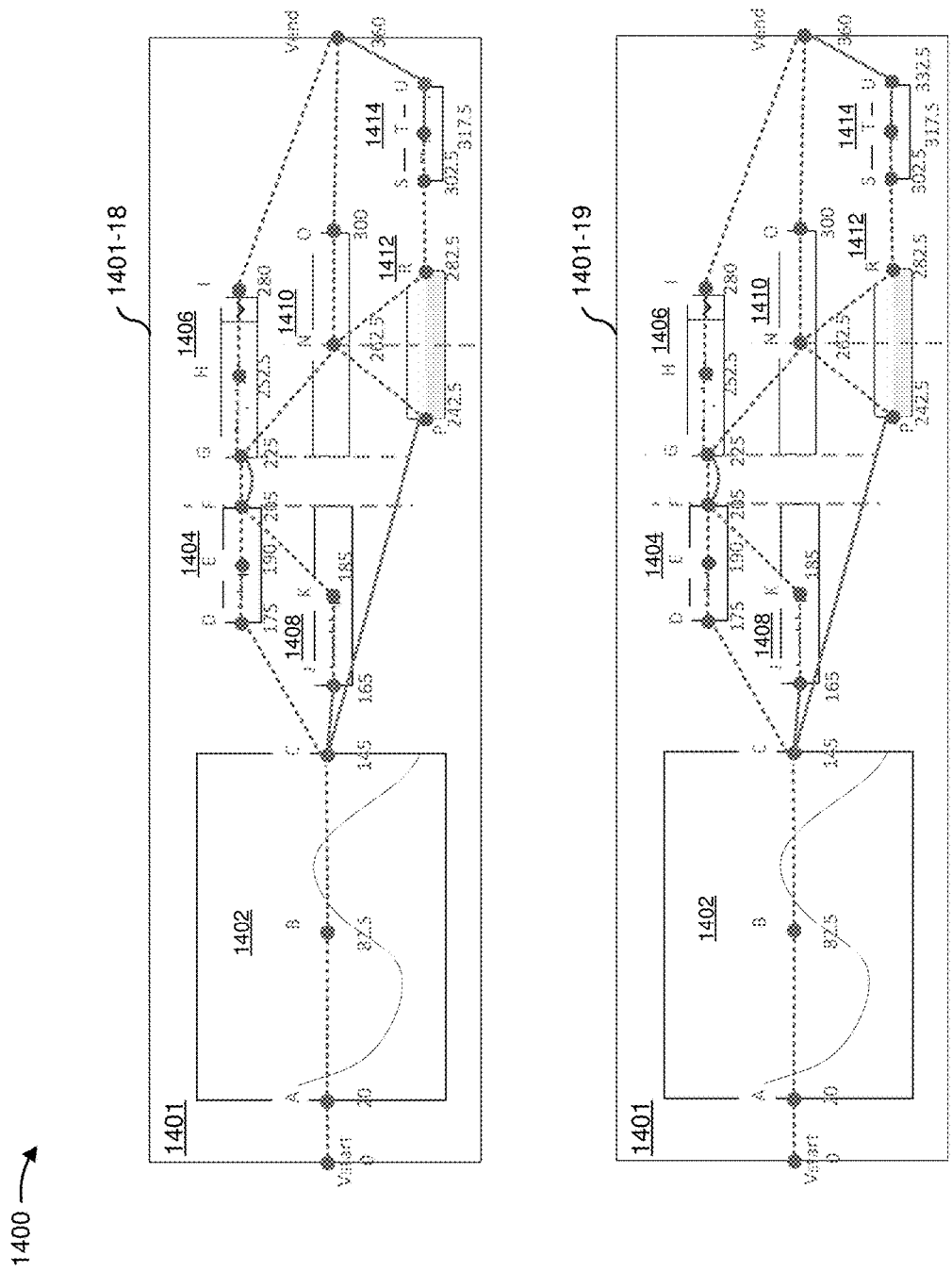
Figure 14O:
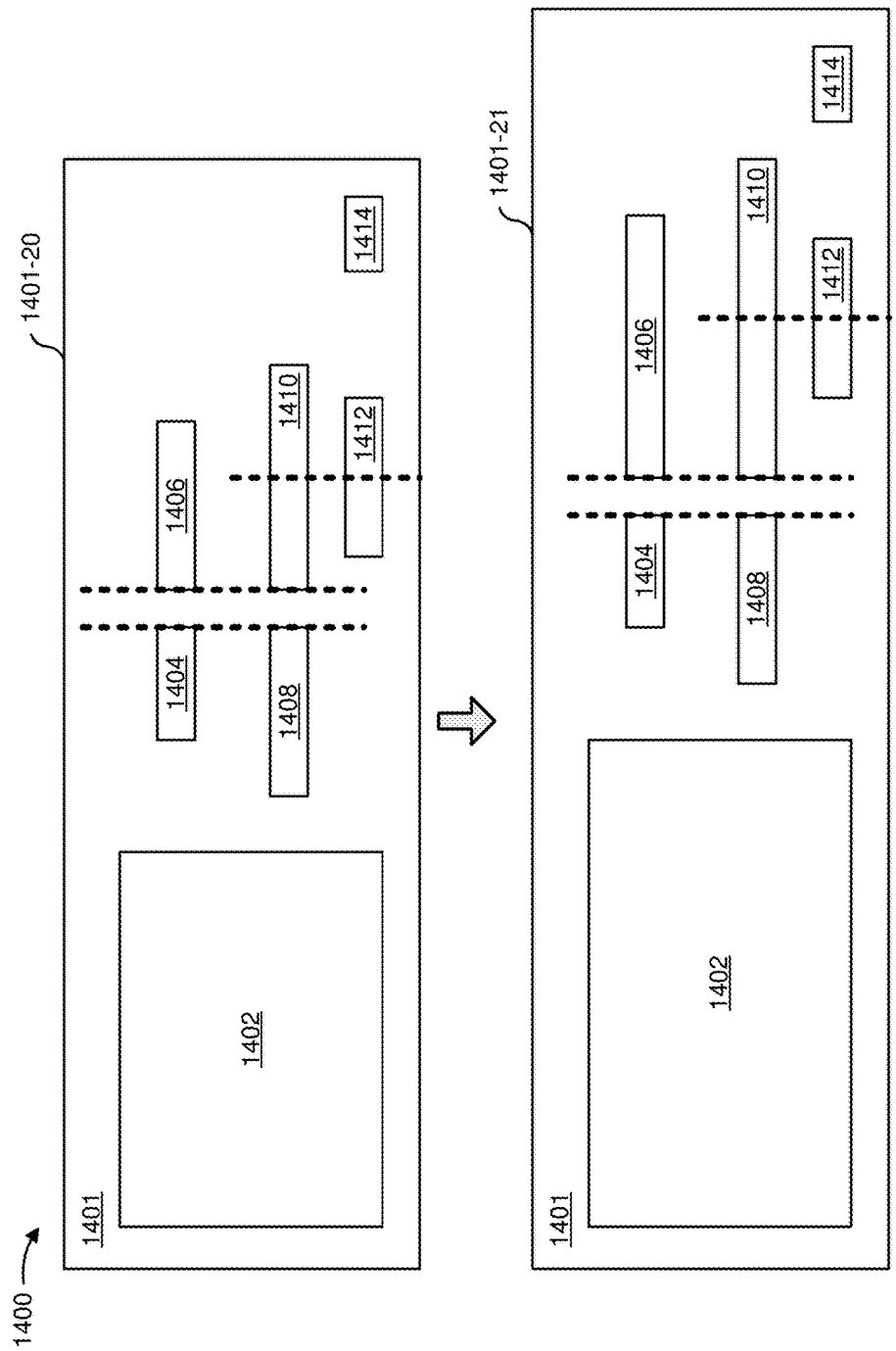

Client device 210 may relocate one or more vertices, of a set of vertices, when adjusting the GUI from a first display condition to a second display condition, in some implementations, as discussed herein with regard to FIGS. 14A-14O. For example, when client device 210 detects a change to the GUI, such as an adjusted GUI display size, an adjusted GUI display resolution, an adjusted GUI display language, an adjusted GUI display aspect ratio, or the like, client device 210 may relocate one or more vertices representing boundaries of the GUI, as described in detail with regard to FIGS. 14D and 14E. Additionally, or alternatively, when client device 210 determines that an element, of the set of elements, is being resized and/or determines to resize the element, client device 210 may relocate one or more vertices representing a boundary of the element.

Additionally, or alternatively, client device 210 may relocate one or more other vertices, of the set of vertices, to redistribute areas of the GUI when boundaries of the GUI and/or locations of elements of the GUI are altered. For example, client device 210 may relocate one or more vertices representing an element of the GUI to increase the size of the element when the GUI is increased in size. In some implementations, client device 210 may select a path that includes a set of vertices and may relocate the set of vertices, when redistributing areas of the GUI. A path may refer to a set of vertices and edges connecting a directed graph from a first vertex to a second vertex, as described herein with regard to FIG. 14F. For example, client device 210 may select a path that includes a first vertex connected by a first edge to a second vertex, which connects by a second edge to a third vertex. In this case, client device 210 may relocate the first vertex, second vertex, and third vertex, as described herein with regard to FIGS. 14G-14H.

In some implementations, client device 210 may determine a resize factor for the set of vertices and a set of edges corresponding to the set of vertices when relocating one or more vertices of a particular path. A resize factor may refer to an extent to which a particular edge is to increase/decrease in size compared to one or more other edges of the graph representation (e.g., a relative scalability of an element compared with another element). For example, an edge associated with representing a horizontal size of an element (e.g., an internal relationship type of layout relationship) may be associated with a resize factor that corresponds to an extent to which the element is to increase/decrease in size horizontally compared with other edges representing layout relationships. In this case, client device 210 may relocate vertices of a particular path that includes the edge based on comparing resize factors of edges of the particular path. In some implementations, client device 210 may select a path based on a set of path criteria, such as a total combined resize factor and/or another criterion.

In some implementations, client device 210 may relocate vertices of a particular path proportionally, as described in detail with regard to FIGS. 14F-14G. For example, when client device 210 relocates a first vertex and a last vertex of a path based on resizing a GUI represented by the path, client device 210 may determine a size increase for the path based on relocating the first vertex and the last vertex, and may divide the size increase among edges of the path proportionally, based on a resize factor, or based on another factor. In this case, client device 210 may relocate other vertices of the path based on dividing the size increase among the edges.

In some implementations, client device 210 may relocate a vertex based on a relationship with another vertex and/or based on an edge. For example, when client device 210 relocates a first vertex, of a first path, client device 210 may identify an edge connected to the first vertex and to a second vertex, associated with a particular edge length, and associated with a zero resize factor (e.g., the edge is not to be increased/decreased in size). In this case, client device 210 may assign the second vertex to a particular pixel location that maintains the particular edge length based on the pixel location of the first vertex. Although a vertex location, a location of a vertex, or the like may be described as a pixel location in a pixel coordinate system, the vertex location may utilize another coordinate system for describing locations of vertices, sizes of edges, or the like.

In some implementations, client device 210 may determine locations for the set of elements based on relocating vertices corresponding to the elements via the graph representation, based on other vertices, based on edges connecting the vertices, based on other edges, or the like. For example, client device 210 may set a left boundary of an element to a vertex corresponding to the left boundary. Additionally, or alternatively, client device 210 may adjust the location of an element based on an aspect ratio of the element. For example, client device 210 may identify a first aspect ratio as an attribute of an element, may determine that, based on a set of relocated vertices corresponding to the element, the element is associated with a second aspect ratio, and may alter the width and/or height of the element to maintain the first aspect ratio. Additionally, or alternatively client device 210 may adjust the location of an element based on an attribute, such as a minimum size, a maximum size, a resizability, or the like for the element, for another element, for the GUI, or the like. Additionally, or alternatively, client device 210 may adjust the location of an element based on a user selection. For example, a user may provide input to alter the automatic resizing performing by client device 210.

As further shown in FIG. 11, process 1100 may include causing the set of elements to be displayed based on the graph representation of the set of elements (block 1140). For example, client device 210 may cause the GUI to be displayed based on the graph representation of the set of elements. When the GUI is resized, client device 210 may utilize relocated positions for vertices corresponding to boundaries of the set of elements to determine where to set boundaries for the set of elements in the resized GUI, in some implementations. For example, client device 210 may identify a set of four relocated vertices representing horizontal and vertical boundaries of an element, and may cause the element to be displayed with the horizontal and vertical boundaries corresponding to the four relocated vertices.

In some implementations, client device 210 may save the graph representation of the set of elements when causing the set of elements to be displayed. For example, client device 210 may generate a graph representation to resize the set of elements, and may save the graph representation to be utilized when the GUI is resized, subsequently. Additionally, or alternatively, client device 210 may discard the graph representation and may re-generate the graph representation when the GUI is resized, subsequently.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
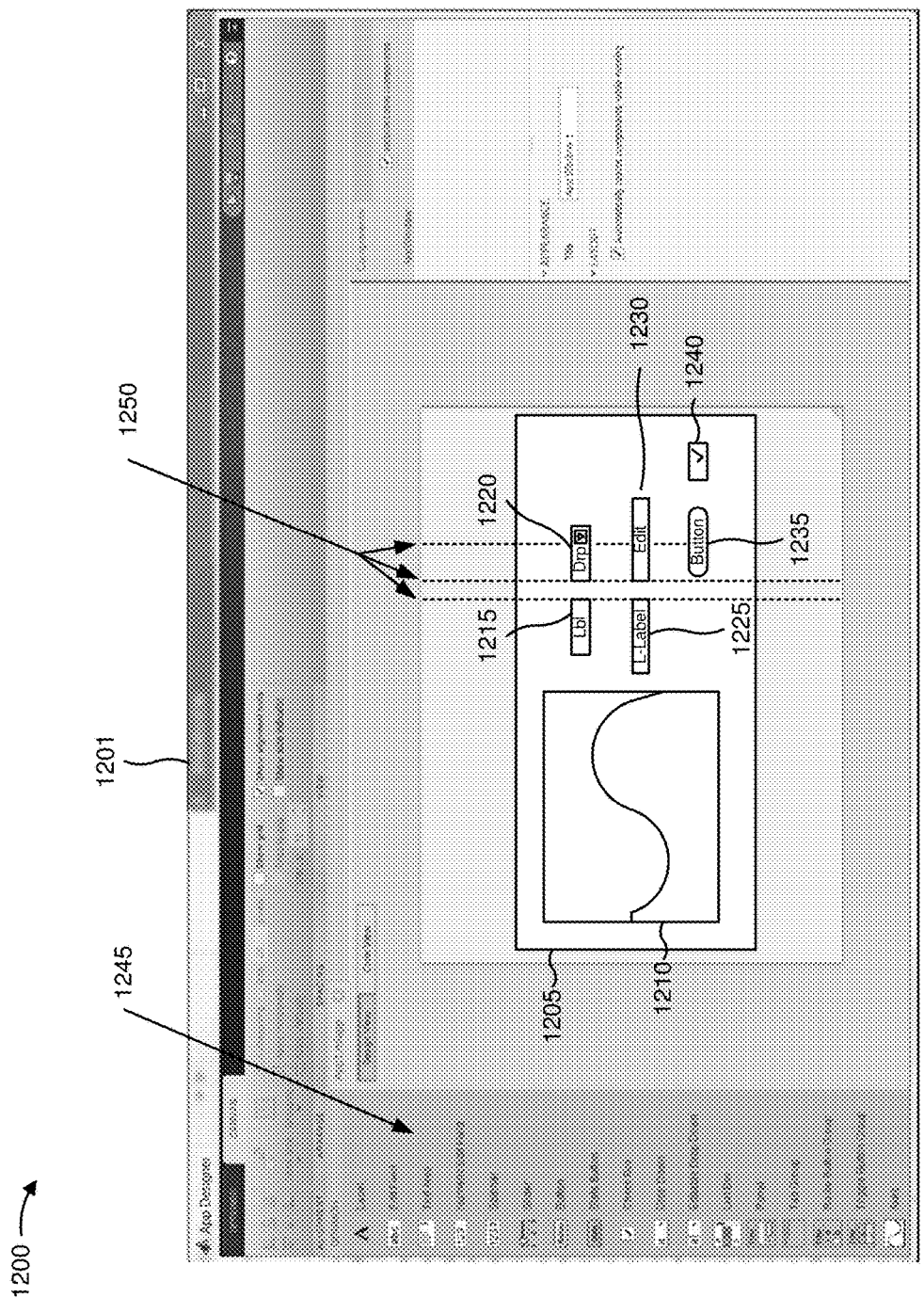
FIG. 12 is a diagram of a user interface for generating a GUI.

FIG. 12 is a diagram of an example implementation 1200 of an example user interface for generating a GUI that may be utilized in association process 1100, described herein.

As shown in FIG. 12, and by reference number 1201, an interface (e.g., a GUI) 1201 may be utilized to design a GUI 1205. GUI 1205 may include a chart element 1210, a first label element (e.g., "Lb1") 1215, a drop-box element (e.g., "Drp") 1220, a long-label element (e.g., "L-Label") 1225, an edit field element (e.g., "Edit") 1230, a button element (e.g., "Button") 1235, and a check box element 1240. As shown by reference number 1245, user interface 1201 may include a set of selectable elements that may be added to GUI 1205, such as a label element, an edit field element, a text area element, or the like. As shown by reference number 1250, user interface 1201 may provide alignment lines to facilitate a user in aligning elements as the user builds the GUI 1205. In some implementations, upon a user request, an alignment line may be added to indicate a desired layout relationship. Additionally, or alternatively, client device 210 may analyze GUI 1205 to determine a layout relationship as described herein with regard to FIG. 5, and client device 210 may indicate the layout relationship with an alignment line.

As indicated above, FIG. 12 is provided merely as an example. Other examples are possible and may differ from what was described with regard to FIG. 12.

FIGS. 13A-13C are diagrams of an example implementation 1300 of representing a set of elements and layout relationships associated with the set of elements using a set of vertices and a set of edges.

As shown in FIG. 13A, element 1302 and element 1304 are included in GUI 1306. Client device 210 chooses, for element 1302, a left boundary vertex, a center-point vertex, and a right boundary vertex. Vertices are represented, herein, as dots. Although a vertex is depicted visually, client device 210 may generate the set of vertices by generating a set of coordinates representing the set of vertices. In some implementations, vertex coordinates may be determined based on an x-coordinate, y-coordinate system; an x-coordinate, y-coordinate, a height, and a width coordinate system; a polar coordinate system; or another coordinate system for describing positions of elements in GUI 1306. Client device 210 chooses, for element 1304, a left boundary vertex, a center-point vertex and a right boundary vertex. Assume that client device 210 determines that element 1302 and element 1304 are associated by a horizontal collision relationship (e.g., element 1302 collides with element 1304 when element 1302 is increased in size, horizontally). As shown by reference number 1308, client device 210 generates edge 1308 (e.g., a directed edge) to connect the right boundary vertex of element 1302 and the left boundary of element 1304, thereby representing the horizontal collision relationship. Although an edge is depicted visually, client device 210 may generate a set of edges by generating an association between a first coordinate (e.g., corresponding to a first vertex of an edge) and a second coordinate (e.g., corresponding to a second vertex of the edge). In this way, an edge may be utilized to represent a collision relationship between elements of a GUI.

As further shown in FIG. 13A, GUI 1310 includes element 1312 and element 1314. Assume that client device 210 determines that element 1312 and element 1314 are associated by a vertical collision relationship (e.g., element 1312 collides with element 1314 when element 1312 is increased in size, vertically). As shown by reference number 1316, client device 210 generates edge 1316 (e.g., a directed edge) to connect a lower boundary vertex of element 1312 with an upper boundary vertex of element 1314. In this way, an edge may be utilized to represent a collision relationship between elements of a GUI.

As shown in FIG. 13B, GUI 1318 may include an element 1320, an element 1322, and an element 1324. Client device 210 chooses a left boundary vertex to GUI 1318, a right boundary vertex to GUI 1318, a left boundary vertex to element 1320, a right boundary vertex to element 1322, a left boundary vertex to element 1324, and a right boundary vertex to element 1324. Assume that client device 210 determines that GUI 1318 is associated with element 1320 and element 1324 by a containment relationship (e.g., GUI 1318 contains element 1320 and element 1324). Client device 210 generates edges 1326-1332 to represent the containment relationship. In this way, an edge may be utilized to represent a containment relationship between elements of a GUI.

As further shown in FIG. 13B, GUI 1332 may include element 1334 and element 1336. Element 1334 includes a set of vertices—a left boundary vertex, a center-point vertex, and a right boundary vertex—and a set of edges connecting the set of boundaries, representing internal relationships between vertices of the set of vertices. Element 1336 includes a similar set of vertices and a similar set of edges. As shown by reference number 1338, client device 210 identifies an alignment relationship exists between the left boundary of element 1334 and the left boundary of element 1336. As shown by reference number 1339, based on identifying the alignment relationship, client device 210 merges the left boundary vertex of element 1334 and the left boundary vertex of element 1336 into a single merged vertex. Edges connected to the left boundary vertex of element 1334 and edges connected to the left boundary vertex of element 1336 connect to the merged vertex. In this way, client device 210 may ensure that the alignment relationship is maintained when element 1334 and element 1336 are relocated.

As shown in FIG. 13C, and by reference number 1340-1, a GUI may include a set of elements with a corresponding set of vertices and edges. As shown by reference number 1340-2, two vertices of the GUI may be merged into merged vertex 1342 (e.g., based on a layout relationship—an alignment relationship—between the two vertices) and connected edges of the two vertices may connect to merged vertex 1342. As shown by reference number 1340-3, another two vertices of the GUI may be merged into merged vertex 1344 and connected edges of the other two vertices may connect to merged vertex 1344. As shown by reference number 1340-4, yet another two vertices of the GUI may be merged into merged vertex 1346 and connected edges of the other two vertices may connect to merged vertex 1346. As shown by reference number 1340-5, the GUI may be represented by a vertical graph representation. In another example, the GUI may be represented by a horizontal graph representation. In another example, the GUI may be represented by both a vertical graph representation and a horizontal graph representation.

As indicated above, FIGS. 13A-13C are provided merely as an example. Other examples are possible and may differ from what was described with regard to FIGS. 13A-13C.

FIGS. 14A-14O are diagrams of an example implementation 1400 of utilizing a graph representation of a GUI to facilitate displaying the GUI.

As shown in FIG. 14A, and by reference number 1401-1, client device 210 receives information regarding GUI 1401 (e.g., attributes for elements of GUI 1401, etc.) for display. Before or during display of GUI 1401, client device 210 generates a graph representation by assigning vertices (e.g., vertices, "Vstart," "A," "B," "C," . . . , "T," "U," "Vend") for a horizontal graph representation of the GUI and a set of elements of the GUI. For example, vertices A-C represent a chart element 1402, vertices D-F represent a label element 1404, vertices G-I represent a drop-box element 1406, vertices J-L represent a long-label element 1408, vertices M-O represent an edit field element 1410, vertices P-R represent a button element 1412, and vertices S-U represent a checkbox element 1414. Vertex Vstart represents a left boundary of GUI 1401 and vertex Vend represents a right boundary of GUI 1401. As shown by reference number 1416, client device 210 determines a set of layout relationships (e.g., alignment relationships). As shown by reference number 1401-2, client device 210 generates a set of edges representing relationships between the set of elements and GUI 1401, such as one or more collision relationships, one or more containment relationships, one or more internal relationships, or the like, as described herein with regard to FIGS. 13A-13C. An edge is described by the vertices enclosing the edge, for example, the edge extending from vertex A to vertex B is termed edge AB and the edge extending from Vstart to A is termed Vstart-A. Similarly, a path is described by the vertices enclosing the path, for example the path extending from vertex A to vertex N, via vertices B, C, J, K, L, and M, is termed path ABCJKLMN.

As shown in FIG. 14B, and by reference number 1401-3, client device 210 merges vertex L into vertex F (e.g., to create a merged vertex) based on the label element and the long-label element sharing a right boundary alignment relationship. Client device 210 replaces edge KL with edge KF based on vertex L merging into vertex F. As shown by reference number 1401-4, client device 210 merges vertex M into vertex G based on the drop-box element and the edit field element sharing a left boundary alignment relationship. Client device 210 replaces edge MN with edge GN based on vertex M merging into vertex G.

As shown in FIG. 14C, and by reference number 1401-5, client device 210 merges vertex Q into vertex N based on the edit field element and the button element sharing a center-point alignment relationship. Client device 210 replaces edge PQ with edge PN and edge QR with edge NR based on merging vertex Q into vertex N.

As shown in FIG. 14D, and by reference number 1401-6, client device 210 determines an initial horizontal pixel location (e.g., a pixel value in a pixel coordinate system) for the vertices of the horizontal graph representation of GUI 1401. For example, Vstart is located at pixel value 0 and Vend is located at pixel value 320. Similarly, vertex A is located at pixel value 20, vertex B is located at pixel value 70, vertex C is located at pixel value 120, etc. An edge is associated with an edge length corresponding to the difference between the horizontal pixel location of the first vertex of the edge and the last vertex of the edge. For example, edge KF is associated with an edge length of 20 pixels and edge AB is associated with an edge length of 50 pixels.

As shown in FIG. 14E, and by reference number 1401-7, client device 210 determines a resize factor for the edges of the graph representation. Assume that client device 210 determines that spacings between elements, of the set of elements, such as spacings represented by edge Vstart-A, edge CD, edge CJ, etc. are to remain unchanged when GUI 1401 is resized. For example, client device 210 assigns edge Vstart-A, edge CD, edge CJ, edge CP, edge FG, etc. a resize factor of 0 indicating that the edges are not to be resized. Similarly, client device 210 assigns edge JK, edge DE, edge EF, edge KF, etc., which are associated with widths of corresponding elements, are assigned a resize factor of 0. Client device 210 assigns other edges, such as edges corresponding to the chart element, the edit field element, or the like, non-zero resize factors, indicating that the corresponding elements are to be resized when GUI 1401 is resized. For example, client device 210 assigns edge AB a resize factor of 50, edge BC a resize factor of 50, edge GH a resize factor of 20, etc.

As further shown in FIG. 14E, and by reference number 1401-8, vertex Vend is assigned a new horizontal pixel value of 360 as a result of resizing GUI 1401-8. Based on the previous horizontal pixel value of 320, GUI 1401 has increased in size, horizontally, by 40 pixels. Based on this increase, client device 210 utilizes the graph representation and information associated therewith to resize GUI 1401 and the set of elements thereof, as described herein.

As shown in FIG. 14F, and by reference number 1401-9, client device 210 selects a particular path, including to a set of edges, of the horizontal graph representation. The particular path, referred to as path Vstart-ABCDEFGNO-Vend, is associated with a greater total combined resize factor (e.g., the sum of resize factors of incorporated edges) than other possible paths of the horizontal graph representation. In this case, the path includes a total combined resize factor of 160.

As shown in FIG. 14G, and by reference number 1401-10, client device 210 determines a new edge length for each edge of the particular path (represented by the dashed line) as:

$$L_a = RF/TCRF * E_i$$

$$E_f = E_i + L_a$$

Where $L_a$ represents the location adjustment value for a particular edge, RF represents the resize factor for the particular edge, TCRF represents the total combined resize factor for the particular path, $E_i$ represents the initial edge length for the particular edge, and $E_f$ represents the new edge length for the particular edge. For example, for edge AB, location adjustment $L_a$=50/160*40=12.5 and new edge length $E_f$=50+12.5=62.5. Similarly, for edge GN, location adjustment $L_a$=30/160*40=7.5 and new edge length $E_f$=30+7.5=37.5. And, for edge CD, location adjustment $L_a$=0/160*40=0 and new edge length $E_f$=30+0=30.

As shown in FIG. 14H, and by reference number 1401-11, client device 210 determines a new location for each vertex of the particular path based on the new edge length for each edge as:

$$V(k)_f = V(k-1)_f + E_f$$

Where $V(k)_f$ represents the new pixel value for a particular vertex k (e.g., vertex A, vertex B, vertex C, etc.), $V(k-1)_f$ represents the new pixel value for another vertex k−1 that precedes vertex k on edge E (e.g., without any intervening vertices), and $E_f$ represents the new edge length for an edge connecting vertex k and vertex k−1. For example, for edge Vstart-A, the pixel value for vertex A is $V(A)_f$=0+20=20. Similarly, for edge AB, the pixel value for vertex B is $V(B)_f$=20+62.5=82.5. As another example, for edge BC, the pixel value for vertex C is $V(C)_f$=82.5+62.5=145.

In FIGS. 14I-14N, dashed lines indicate edges and/or associated vertices that have been resized/relocated based on resizing GUI 1401 and solid lines indicate edges and/or associated vertices that have yet to be resized/relocated.

As shown in FIG. 14I, and by reference number 1401-12, client device 210 determines other locations for other vertices that are not included in the particular path based on a relationship with a vertex and/or edge of the particular path. For example, edge PN is associated with an edge length of 20 pixels and a resize factor of 0 indicating that the length of edge PN is not to be increased. Thus, to maintain the edge length of 20 with vertex N's new position, client device 210 relocates vertex P from initial horizontal pixel value 210 to final horizontal pixel value 242.5. As another example, edge KF is associated with an edge length of 20 pixels and a resize factor of 0. Thus, to maintain the edge length of 0 with vertex F's new position, client device 210 relocates vertex K from initial horizontal pixel value 160 to final horizontal pixel value 185.

As shown in FIG. 14J, and by reference number 1401-13, client device 210 determines a new location for vertex J. Edge CJ and edge JK are associated with resize factors of 0 and edge lengths of 20. To maintain the edge lengths of 20, based on the new locations for vertex C and vertex K, client device 210 relocates vertex J to final horizontal pixel value 165.

As shown in FIG. 14K, and by reference number 1401-14, client device 210 selects another path, path Vstart-AB-CDEFGHI-Vend, for which new vertex locations are to be determined. As shown by reference number 1418, based on vertex A and vertex B being relocated to new locations, client device 210 reduces the resize factor for edge AB to 0, indicating that edge AB is no longer to be resized while GUI 1401 retains the same size. Similarly, client device 210 reduces the resize factor for edge BC to 0.

As shown in FIG. 14L, and by reference number 1401-15, client device 210 selects a portion of the selected path, sub-path GHI-Vend, that represents the consecutive non-relocated vertices of the selected path. Client device 210 determine a new edge length for edge GH, edge HI, and edge I-Vend of the sub-path as:

$$S_a = (V_b - V_a) - D_g - D_f$$

$$D_a = GF/TCFG * S_a$$

Where $S_a$ represents available space for the portion of the selected path, $V_b$ represents the horizontal pixel value of the end vertex of the sub-path (e.g., vertex Vend), $V_a$ represents the horizontal pixel value of the beginning vertex of the sub-path (e.g., vertex G), $D_g$ represents the sum of the horizontal pixel length of edges of the sub-path where the resize factor did not equal 0 (e.g., the sum of edge GH and edge HI prior to resizing occurring), $D_f$ represents the sum of the horizontal pixel length of edges of the sub-path where the resize factor did equal 0 (e.g., the horizontal pixel length of edge I-Vend), and $D_a$ represents an adjusted edge length for a particular edge and/or path (e.g., a quantity of pixels by which the length of the particular edge is to be increased/decreased). For example, for path GHI-Vend, available space $S_a$=(360−225)−40−80=15. Further to the example, for edge GH, adjusted edge length $D_a$=20/40*15=7.5. Similarly, for edge HI, adjusted edge length $D_a$=20/40*15=7.5. Similarly, for edge I-Vend, adjusted edge length $D_a$=0/40*15=0. Thus, client device 210 determines, for edge GH, new edge length $E_f$=20+7.5=27.5. For edge HI, new edge length $E_f$=20+7.5=27.5. Based on vertex G being located at horizontal pixel value 225, client device 210 determines that vertex H is to be relocated to horizontal pixel value 252.5 and vertex I is to be relocated to horizontal pixel value 280.

As shown in FIG. 14M, and by reference number 1401-16, client device 210 selects yet another path, path STU-Vend, for which vertices are to be relocated. Based on the total combined resize factor for edge STU-Vend being 0, client device 210 relocates vertex S, vertex T, and vertex U without determining a new edge length for edge ST, edge TU, and edge U-Vend. As shown by reference number 1401-17, based on vertex R being located at horizontal pixel value 282.5 and edge RS being associated with an edge length of 20 pixels, client device 210 relocates vertex S to horizontal pixel location 302.5.

As shown in FIG. 14N, and by reference number 1401-18, based on vertex S being relocated to horizontal pixel location 302.5 and edge ST being associated with a horizontal pixel length of 15 pixels, client device 210 relocates vertex T to horizontal pixel location 317.5. Similarly, and as shown by reference number 1401-19, client device 210 relocates vertex U to horizontal pixel location 332.5. Assume that client device 210 performs a similar set of steps as described in FIGS. 14A-14N to determine new locations for vertices of a vertical graph representation of GUI 1401. Assume that client device 210 provides GUI 1401 to the user using the relocated vertex positions as boundaries for generating the elements represented thereby.

As shown in FIG. 14O, GUI 1401 is displayed prior to resizing GUI 1401, as shown by reference number 1401-20. As shown by reference number 1401-21, GUI 1401 is shown after resizing with multiple alignment relationships maintained.

As indicated above, FIGS. 14A-14O are provided merely as an example. Other examples are possible and may differ from what was described with regard to FIGS. 14A-14O.

In this way, client device 210 may facilitate resizing a GUI by generating a graph representation of the GUI, relocating vertices of the graph representation of the GUI corresponding to boundaries of elements of the GUI, and providing the GUI with boundaries of elements determined based on the relocated vertices of the graph representation of the GUI. In this way, layout relationships and/or alignments may be maintained during resizing.

Figure 15:
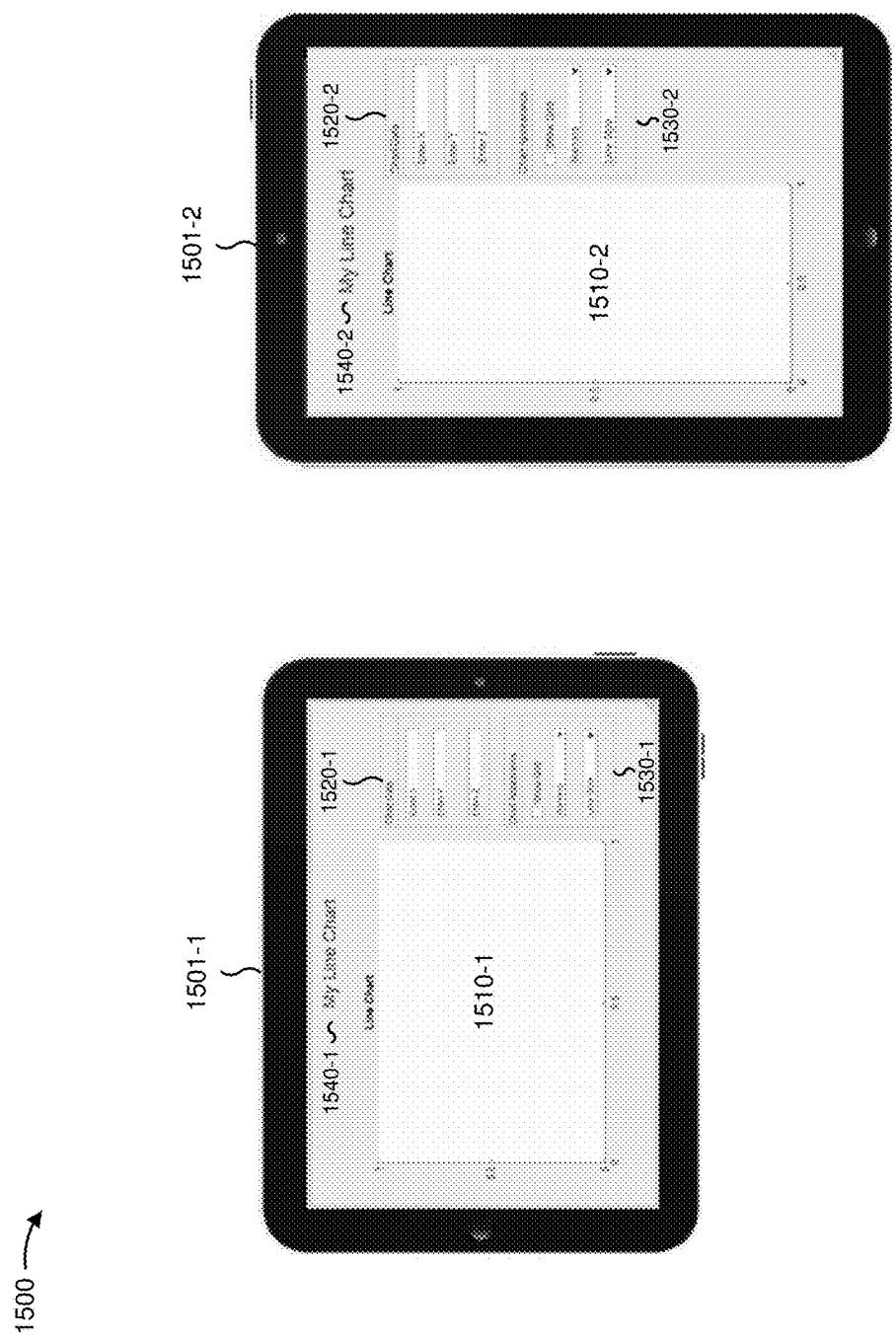
FIG. 15 is a diagram of an example implementation relating to the example process shown in FIG. 12.

FIG. 15 is a diagram of an example implementation 1500 of utilizing a graph representation of a GUI to facilitate displaying the GUI. FIG. 15 illustrates how a GUI may be resized when changing from a first display condition to a second display condition.

As shown in FIG. 15, a GUI in a first display condition 1501-1 may be altered to a second display condition 1501-2 based on a display on which the GUI is being displayed having a display orientation altered (e.g., altered from a landscape display orientation to a portrait display orientation). Assume that a graph representation is generated based on the GUI in display condition 1501-1 and utilized to display the GUI in display condition 1501-2. For example, "Line Chart" 1510-1 is altered to "Line Chart 1510-2" with a differently shaped chart area and maintained axes. As another example, a first set of elements, "Chart Data" 1520-1 is displayed as "Chart Data" 1520-2 while maintaining alignment between elements of the first set of elements and a minimum size for each element of the first set of elements. Similarly, a second set of elements "Chart Appearance" 1530-1 is displayed as "Chart Appearance 1530-2 with alignment maintained between elements of the second set of elements and with the second set of elements maintaining an alignment with the first set of elements. Further to the example, title "My Line Chart" 1540-1 is displayed as "My Line Chart" 1540-2 with a text size altered based on the second display condition but maintaining a center alignment in the GUI.

As indicated above, FIG. 15 is provided merely as an example. Other examples are possible and may differ from what was described with regard to FIG. 15.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term "component" is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   generating, by a device, a graph of a set of elements included in a graphical user interface,
      an attribute of an element, of the set of elements, being represented by a vertex of the graph,
      the vertex being associated with a vertex location, and
      a layout relationship associated with the set of elements being represented by an edge of the graph;
   selecting, by the device, a path included in the graph of the graphical user interface,
      the path including a particular set of vertices and a particular set of edges,
      the particular set of vertices including the vertex, and
      the path being selected based on a set of selection criteria;
   determining, by the device, a set of resize factors associated with the path;
   determining, by the device, another vertex location for the vertex based on a set of resize factors associated with the path,
      the other vertex location corresponding to another attribute for the element of the set of elements; and
   providing, by the device and for display, the set of elements based on the other attribute for the element.

2. The method of claim 1, further comprising:
   altering a location of a particular vertex, of the particular set of vertices, to an altered location based on the graph; and
   altering the attribute of the element based on the altered location of the particular vertex.

3. The method of claim 1, further comprising:
   detecting a change from a first display condition to a second display condition; and
   adjusting a display of the set of elements based on detecting the change from the first display condition to the second display condition.

4. The method of claim 3, where the change from the first display condition to the second display condition comprises at least one of:
   a change to a display size associated with the graphical user interface,
   a change to a display on which the graphical user interface is displayed,
   a change to a display resolution at which the graphical user interface is displayed, a change to a display orientation at which the graphical user interface is displayed, a change to a language of the graphical user interface, a change to an operating system used to display the graphical user interface, or a change to an application used to display the graphical user interface.

5. The method of claim 1, further comprising:

comparing a first attribute of a first particular element, of the set of elements, with a second attribute of a second particular element, of the set of elements; and determining the layout relationship based on comparing the first attribute with the second attribute.

6. The method of claim 1, further comprising:

detecting a change from a first display condition to a second display condition; and causing the graphical user interface to be displayed in the second display condition based on adjusting the display of the set of elements.

7. The method of claim 1, where the graphical user interface is a particular element of the set of elements.

8. A computer-readable medium storing instructions, the instructions comprising:

one or more instructions that, when executed by one or more processors, cause the one or more processors to:

generate a graph of a set of elements included in a graphical user interface, an attribute of an element, of the set of elements, being represented by a vertex of the graph, the vertex being associated with a vertex location, a layout relationship associated with the set of elements being represented by an edge of the graph, the edge being associated with an edge length;

select a path included in the graph of the graphical user interface, the path including a particular set of vertices and a particular set of edges, the particular set of vertices including the vertex, and the path being selected based on a set of selection criteria;

determine a set of resize factors associated with the path;

determine another vertex location for the vertex based on the set of resize factors associated with the path, the other vertex location corresponding to another attribute for the element of the set of elements; and provide, for display, the set of elements based on the other attribute for the element.

9. The computer-readable medium of claim 8, where the one or more instructions, further cause the one or more processors to:

detect a change to the graphical user interface based on the graph of the set of elements; and determine another edge length for the edge based on detecting the change to the graphical user interface and based on the graph of the set of elements; and where the one or more instructions, that cause the one or more processors to provide the set of elements, further cause the one or more processors to:

provide the set of elements based on the other edge length for the edge.

10. The computer-readable medium of claim 8, where the one or more instructions further cause the one or more processors to:

generate the particular set of vertices corresponding to one or more boundaries of the set of elements; and generate the edge based on the set of vertices; and where the one or more instructions, that cause the one or more processors to determine the other vertex location for the vertex, cause the one or more processors to:

determine the other vertex location based on at least one of:

the edge, or the edge and one or more other edges associated with the graph.

11. The computer-readable medium of claim 8, where the one or more instructions cause the one or more processors to:

determine that another element, of the set of elements, shares an alignment relationship with the element of the set of elements, the element being represented by another vertex; and merge the other vertex with the vertex based on determining that the other element, of the set of elements, shares the alignment relationship with the element of the set of elements, edges of the other vertex connecting to the vertex based on merging the other vertex with the vertex.

12. The computer-readable medium of claim 11, where the one or more instructions cause the one or more processors to:

assign the other vertex location to the other vertex based on merging the other vertex with the vertex.

13. The computer-readable medium of claim 8, where the attribute of the element is at least one of:

a boundary of the element, or a center-point of the element.

14. The computer-readable medium of claim 8, where the one or more instructions, that cause the one or more processors to determine the other vertex location, further cause the one or more processors to:

determine the other vertex location based on at least one of:

a maximum size of the edge, a minimum size of the edge, or a resizability of the edge.

15. The computer-readable medium of claim 8, where a resize factor, of the set of resize factors, corresponds to an extent to which a particular edge is to increase or decrease in size compared to one or more other edges of the graph.

16. A device, comprising:

one or more processors to:

generate a graph of a set of elements of a graphical user interface, an attribute of an element, of the set of elements, being represented by a vertex of the graph, the vertex being associated with a vertex location, and a layout relationship associated with the set of elements being represented by an edge of the graph, the edge being associated with an edge length;

select a path included in the graph, the path including a particular set of vertices and a particular set of edges, the particular set of vertices including the vertex, and the path being selected based on a set of selection criteria;

determine a set of resize factors associated with the path;

determine another vertex location for the vertex based on the set of resize factors associated with the path, the other vertex location corresponding to another attribute for the element of the set of elements; and provide, for display, the set of elements based on the other attribute for the element.

17. The device of claim 16, where the one or more processors are further to:
store the graph in a data structure;
obtain the graph from the data structure; and
utilize the graph to provide, for display, an element of the set of elements.

18. The device of claim 16,
where the one or more processors are further to:
determine a location for the element based on the other vertex location; and
where the one or more processors, when providing, for display, the set of elements, are further to:
provide, for display, the element at the location for the element.

19. The device of claim 16,
where the one or more processors are further to:
select a particular edge of the particular set of edges, the particular edge being connected to a first vertex, of the particular set of vertices, and a second vertex of the particular set of vertices;
adjust the edge from a first edge size to a second edge size based on the set of resize factors; and
relocate at least one of the first vertex or the second vertex based on adjusting the edge from the first edge size to the second edge size.

20. The device of claim 16, where the one or more processors, when generating the graph, are to:
generate the particular set of vertices; and
generate one or more edges, of the particular set of edges, to connect one or more vertices of the particular set of vertices.

* * * * *